United States Patent
Suwandy et al.

(10) Patent No.: US 11,250,839 B2
(45) Date of Patent: Feb. 15, 2022

(54) NATURAL LANGUAGE PROCESSING MODELS FOR CONVERSATIONAL COMPUTING

(71) Applicant: Microsoft Technology Licensing, LLC, Redmond, WA (US)

(72) Inventors: Tien Widya Suwandy, Sammamish, WA (US); David Shigeru Taniguchi, Kirkland, WA (US); Cezary Antoni Marcjan, Redmond, WA (US); Hung-chih Yang, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 44 days.

(21) Appl. No.: 16/850,568

(22) Filed: Apr. 16, 2020

(65) Prior Publication Data
US 2021/0327413 A1   Oct. 21, 2021

(51) Int. Cl.
*G10L 15/197* (2013.01)
*G10L 15/06* (2013.01)

(52) U.S. Cl.
CPC .......... *G10L 15/063* (2013.01); *G10L 15/197* (2013.01)

(58) Field of Classification Search
CPC ............................ G10L 15/063; G10L 15/197
USPC ........................................................ 704/243
See application file for complete search history.

(56) References Cited

U.S. PATENT DOCUMENTS

| | | | | |
|---|---|---|---|---|
| 2007/0257934 A1* | 11/2007 | Doermann | ............... | G06K 9/36 345/606 |
| 2020/0257963 A1* | 8/2020 | Abhinav | ................. | G06N 20/00 |
| 2021/0019375 A1* | 1/2021 | Croutwater | ............. | G06F 40/30 |
| 2021/0097110 A1* | 4/2021 | Asthana | ................... | H04L 51/02 |
| 2021/0103775 A1* | 4/2021 | Glass | ................... | G06K 9/6257 |
| 2021/0150340 A1* | 5/2021 | Liu | ....................... | G06N 3/0454 |

OTHER PUBLICATIONS

M. Virkar, V. Honmane and S. U. Rao, "Humanizing the Chatbot with Semantics based Natural Language Generation," 2019 International Conference on Intelligent Computing and Control Systems (ICCS), 2019, pp. 891-894, doi: 10.1109/ICCS45141.2019.9065723. (Year: 2019).*

(Continued)

*Primary Examiner* — Bharatkumar S Shah

(57) ABSTRACT

In non-limiting examples of the present disclosure, systems, methods and devices for training conversational language models are presented. An embedding library may be generated and maintained. Exemplary target inputs and associated intent types may be received. The target inputs may be encoded into contextual embeddings. The embeddings may be added to the embedding library. When a conversational entity receives a new natural language input, that new input may be encoded into a contextual embedding. The new embedding may be added to the embedding library. A similarity score model may be applied to the new embedding and one or more embeddings for the exemplary target inputs. Similarity scores may be calculated based on the application of the similarity score model. A response may be generated by the conversational entity for an intent type for which a similarity score exceeds a threshold value.

20 Claims, 14 Drawing Sheets

(56) References Cited

OTHER PUBLICATIONS

M. Virkar, V. Honmane and S. U. Rao, "Humanizing the Chatbot with Semantics based Natural Language Generation," 2019 International Conference on Intelligent Computing and Control Systems (ICCS), 2019, pp. 891-894, doi: 10.1109/ICCS45141.2019. 9065723. (Year: 2019) (Year: 2019).*

"Hamming-Abstand-Wikipedia", Retrieved From: http://web.archive.org/web/20190502081753/https://de.wikipedia.org/wiki/Hamming-Abstand, Nov. 3, 2019, 5 Pages.

"Measuring Similarity from Embeddings", Retrieved From:https://developers.google.com/machinelearning/clustering/similarity/measuring-similarity, Feb. 10, 2020, 2 Pages.

Alibadi, et al., "Using Pre-trained Embeddings to Detect the Intent of an Email", In Proceedings of the 7th ACIS International Conference on Applied Computing and Information Technology, May 29, 2019, pp. 6-12.

"International Search Report and Written Opinion Issued in PCT Application No. PCT/US21/018085", dated May 27, 2021, 12 Pages.

Wochinger, Tobias, "Rasa NLU in Depth: Intent Classification", Retrieved From: http://web.archive.org/web/*/https://blog.rasa.com/rasa-nlu-in-depth-part-1-intent-classification/, May 26, 2019, 10 Pages.

Yolchuyeva, et al., "Self-Attention Networks for Intent Detection", In Proceedings of the International Conference on Natural Language Processing in a Deep Learning world, Oct. 22, 2019, pp. 1373-1379.

\* cited by examiner

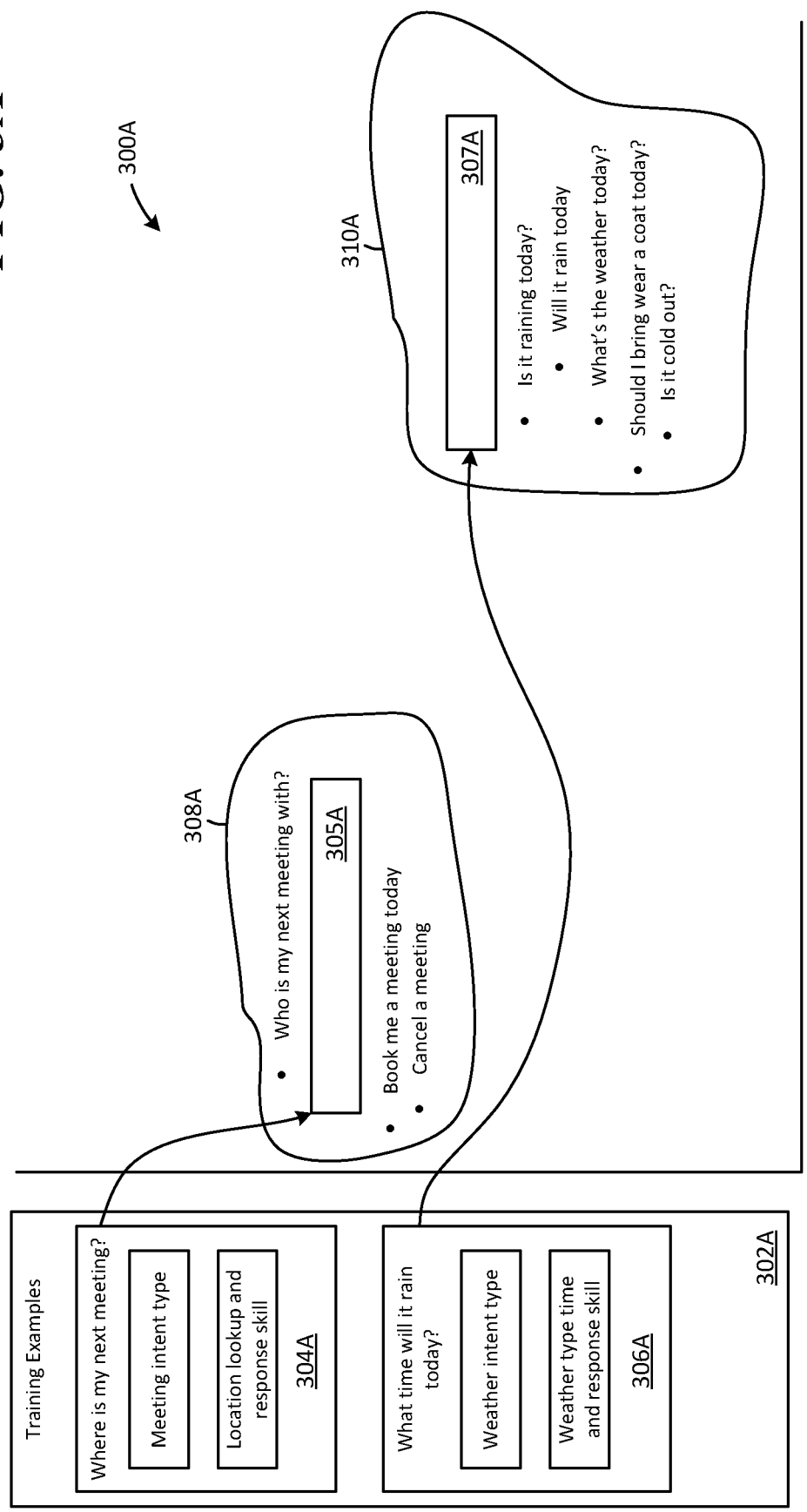

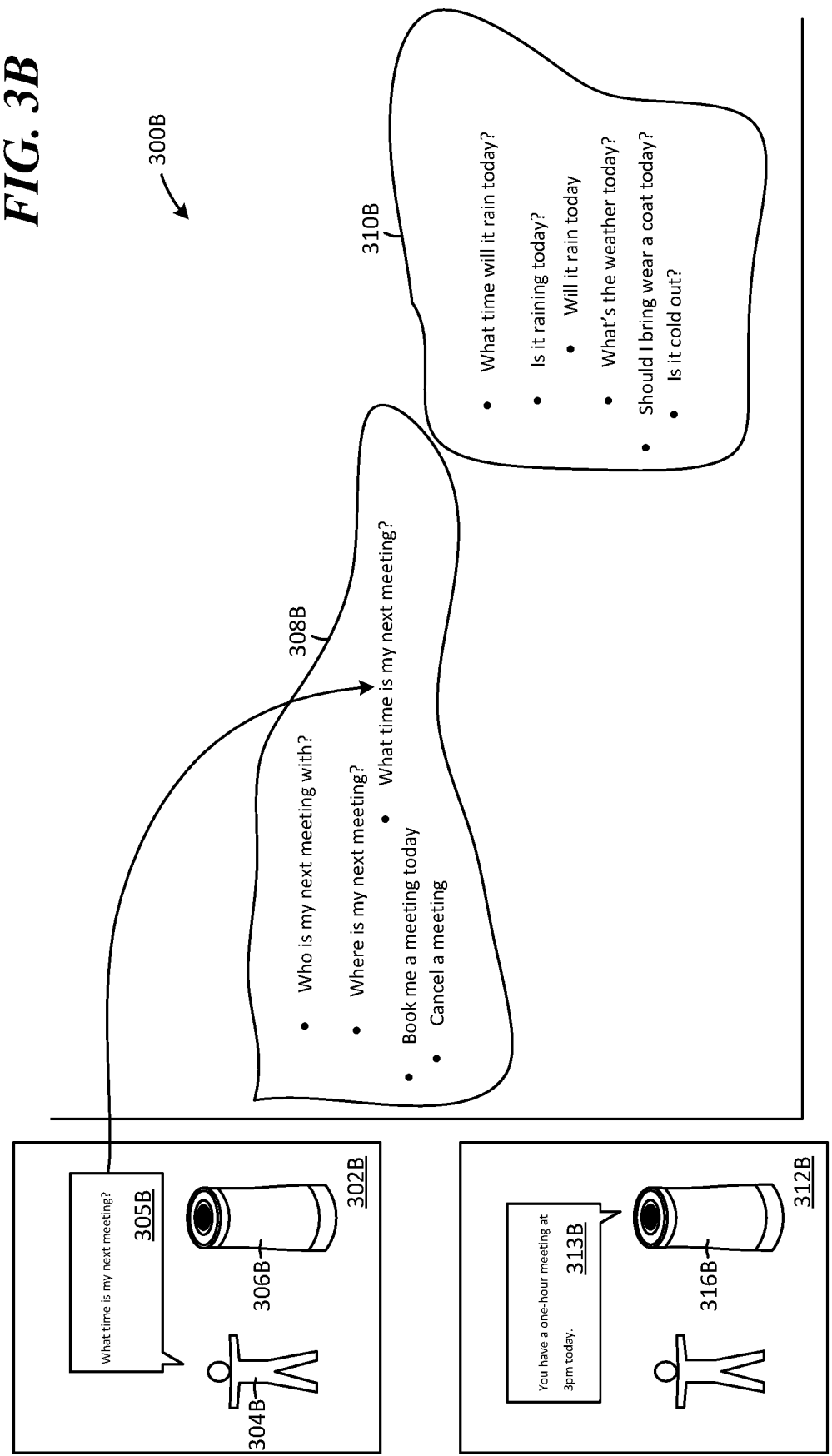

NATURAL LANGUAGE PROCESSING MODELS FOR CONVERSATIONAL COMPUTING

BACKGROUND

Entities are increasingly using conversational bots or assistants to handle user requests and commands related to their goods and services. As conversational bots and assistants are handling more and more requests, the number of language models needed to address those requests have become more numerous and more complex. Creating, updating, and training language models for conversational bots and assistants is time consuming and resource intensive.

It is with respect to this general technical environment that aspects of the present technology disclosed herein have been contemplated. Furthermore, although a general environment has been discussed, it should be understood that the examples described herein should not be limited to the general environment identified in the background.

SUMMARY

This summary is provided to introduce a selection of concepts in a simplified form that are further described below in the Detailed Description section. This summary is not intended to identify key features or essential features of the claimed subject matter, nor is it intended to be used as an aid in determining the scope of the claimed subject matter. Additional aspects, features, and/or advantages of examples will be set forth in part in the description which follows and, in part, will be apparent from the description or may be learned by practice of the disclosure.

Non-limiting examples of the present disclosure describe systems, methods and devices for training language models that may be utilized in enabling conversational computing. An encoding model may be utilized to encode natural language from one or more sources into embeddings. In some examples, the encoding model may be a contextual encoding model. In additional examples, the encoding model may be a transformer-based encoder language processing model. The embeddings may be added to an embedding library. Conversational entity (e.g., conversational bot, conversational assistant) developers may create example files containing intent types and/or skill types that their conversational entities will handle. The intent types and/or skill types may be associated with target natural language inputs that may be utilized to target those intents and skill types. The example natural language inputs may be encoded into embeddings and added to the embedding library. When a new natural language user input is received by a conversational entity, it may be encoded into an embedding and inserted into the embedding library. A similarity score model may be applied to the new embedding and one or more example embeddings to determine a similarity score. A response and/or action may be generated by the conversational entity for any example intent type and/or example skill type for which the embedding from the new natural language input exceeds a threshold value.

BRIEF DESCRIPTION OF THE DRAWINGS

Non-limiting and non-exhaustive examples are described with reference to the following figures:

FIG. 3A illustrates a simplified graph of sentence embeddings in an embedding library and the training of a language model via inclusion of two new examples to the embedding library.

FIG. 3B illustrates a simplified graph of sentence embeddings in an embedding library and the use of that embedding library in processing a novel natural language input utilizing a similarity score model.

DETAILED DESCRIPTION

Figure 1:
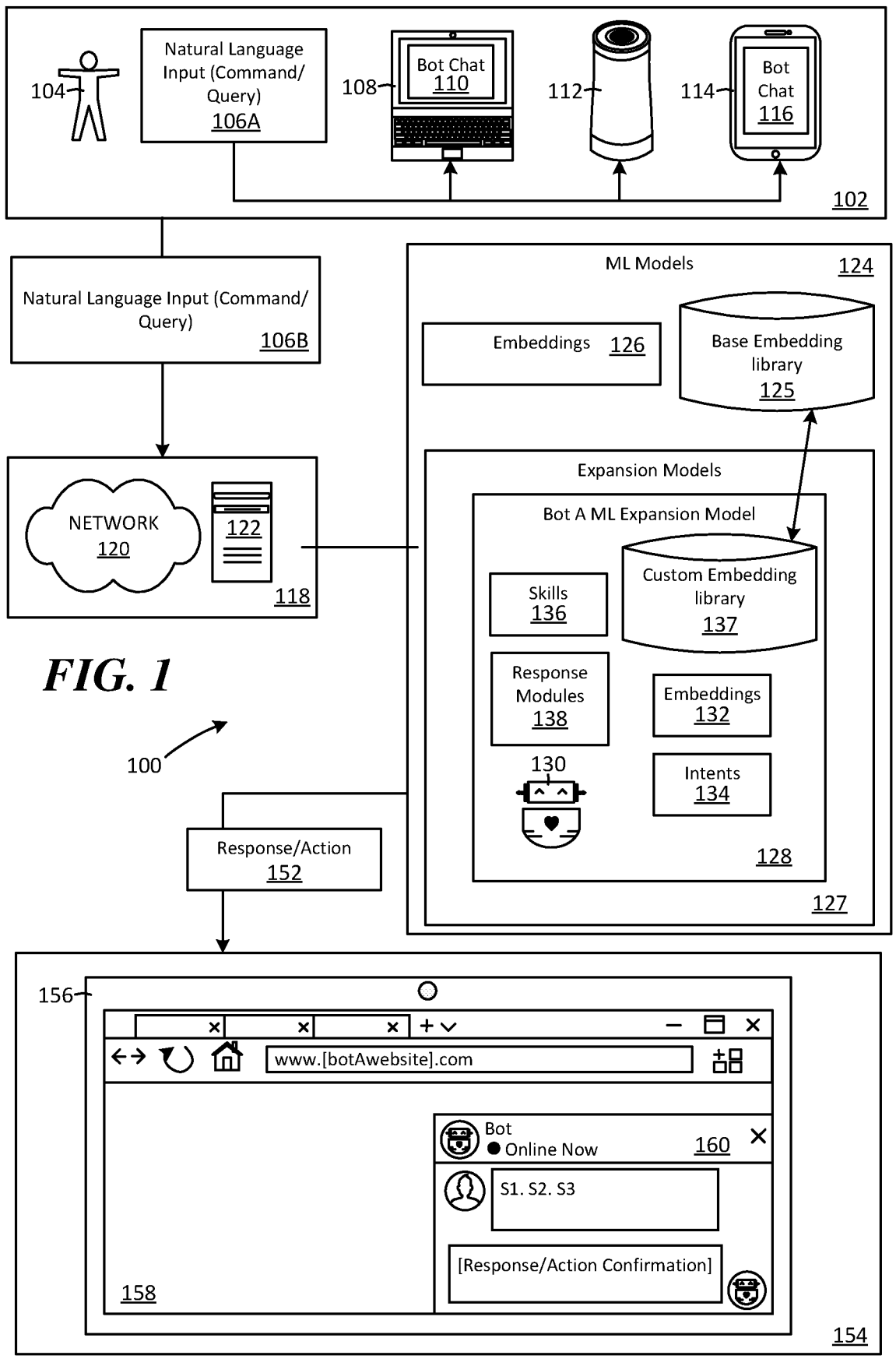
FIG. 1 is a schematic diagram illustrating an example distributed computing environment for training a language model and use of that model in handling natural language inputs to conversational entities.

Various embodiments will be described in detail with reference to the drawings, wherein like reference numerals represent like parts and assemblies throughout the several views. Reference to various embodiments does not limit the scope of the claims attached hereto. Additionally, any examples set forth in this specification are not intended to be limiting and merely set forth some of the many possible embodiments for the appended claims.

The various embodiments and examples described above are provided by way of illustration only and should not be construed to limit the claims attached hereto. Those skilled in the art will readily recognize various modifications and changes that may be made without following the example embodiments and applications illustrated and described herein, and without departing from the true spirit and scope of the claims.

Examples of the disclosure provide systems, methods, and devices for training language models that may be utilized in enabling conversational computing communications. A conversational entity, such as a conversational bot and/or a conversational assistant, may be published by, and/or associated with, a particular group, institution, or person. For example, a first company may host a first conversational bot that provides artificial intelligence-driven conversational capabilities in relation to goods and/or services provided by that company, and a second company may host a second conversational bot that provides artificial intelligence-driven conversational capabilities in relation to goods and/or services provided by that company. Other groups, institutions, or persons that a conversational bot may be published by and/or associated with may include individual users, applications, websites, and/or digital assistants.

A conversational bot may comprise one or more software objects that interact with input (e.g., natural language input from a user, schematic input, object-oriented input) and/or other bots in a conversational manner A conversational bot may be associated with one or more skills, and each skill may be associated with one or more manifests. A skill may comprise one or more operations that are performed by a conversational bot to accomplish a task. A manifest may comprise one or more objects that describe how to contact a conversational bot, what capabilities a conversational bot offers, and information about how that information should be published.

In some examples, a conversational bot and/or one or more corresponding manifests may be hosted by an entity's website or database. In additional examples, a plurality of manifests, conversational bots, and/or skills may be stored in one or more repositories. Examples of a conversational bot repository include a conversational computing service and a manifest marketplace. Websites and repositories that host bot manifests may be searchable, and therefore utilized, by computing devices seeking to interact with corresponding bots. Computing devices and their associated applications and interfaces may interact with hosted bots and manifests utilizing one or more application programming interfaces (APIs).

According to examples, a conversational computing service may process natural language inputs received from users. Those inputs may be processed by the conversational computing service via application of a plurality of language models using an embedding library. As described herein an embedding comprises a real number vector representation of one or more words (e.g., word, word string, phrase, sentence) in a predefined vector space. Each real number vector has a plurality of dimensions (e.g., tens, hundreds). As described herein, an embedding library comprises a plurality of embeddings, where words, strings, phrases, and/or sentences that have similar meaning have similar vector representations. The conversational computing service may maintain an embedding library that has been curated from one or more data sources. For example, the embedding library may be generated from language received from one or more general dictionaries and/or corpuses, and/or one or more domain-specific resources (e.g., subject-specific dictionaries and corpuses, technical dictionaries and corpuses, individual website domains, individual applications, website domains related to specific search criteria). The language from these sources may be processed with an encoding model to generate embeddings.

In some examples, the encoding model may be a contextual encoding model. A contextual encoding model may generate a real number vector representation for a linguistic entity (e.g., word, word string, phrase, sentence) based on one or more linguistic entities that precede or follow it. That is, a contextual encoding model takes into account the linguistic context in which a linguistic entity that is being encoded is in. In additional examples, the encoding model may be a transformer-based encoder language processing model. As described herein, a transformer-based encoder language processing model comprises a set of encoders chained together and a set of decoders chained together. Each encoder and decoder in a transformer-based encoder language processing model utilizes an attention mechanism, which weighs the relevance of every input and draws information from them accordingly when producing the output. Each decoder in a transformer-based encoder language processing model also has an additional attention mechanism which draws information from the outputs of previous decoders, before the decoder draws information from the encodings. Both the encoders and decoders may have a final feed-forward neural network for additional processing of the outputs, and may also contain residual connections and layer normalization steps. Once the embeddings are generated, they may be inserted into the embedding library.

Once the embedding library is generated, a developer associated with a conversational entity (e.g., bot, assistant) may add examples to the library. The examples may include identities of intent types and/or skill types corresponding to intents that a corresponding conversational entity may handle. As described herein, an intent comprises a classification of one or more inputs that may be received by a conversational bot, such as into a type of skill or action that may be performed by the conversational bot in response to the input. Exemplary intents include weather, sports, news, and shopping. The examples may further include exemplary natural language inputs for correctly identifying those intent types and/or skill types in an embedding library. The examples may be provided to a conversational computing service in one or more files. In some examples, the files may be tab-delimited (TSV) files. When an example is received by the conversational computing service, the service may encode the natural language input included in the example as an embedding. The embedding may initially be encoded as a continuous encoding (e.g., via ELMo encoding, via BERT encoding, via recurrent neural network encoding). In some examples, the embedding may be subsequently compressed into a binary form. The embedding for the exemplary natural language input may then be added to the embedding library.

During operation, the conversational computing service may process incoming natural language user inputs that have been received via conversational entities. When a new natural language input is received, that input may be encoded as an embedding. In some examples, the embedding may be compressed into a binary form. The embedding may then be added to the embedding library. Once added to the embedding library, a similarity score model may be applied to the new embedding and one or more embeddings from the examples that were provided by the conversational entity developer. In some examples, the similarity score model may be a cosine model. In other examples, the similarity score model may be a Hamming model. A similarity score may be calculated between the new embedding and one or more of the example embeddings. A K Nearest Neighbors (KNN) model may then be utilized to identify one or more intent types and/or skill types that correspond to the new embedding. In some examples, a nearest neighbor score value may be calculated for each of the one or more intent types and/or skill types based on application of the KNN model. In some examples, if a nearest neighbor score value for an intent type and/or skill type exceeds a threshold value, a response or action corresponding to that intent and/or skill type may be performed by the conversational entity. In other examples, a conversational entity may only perform an action corresponding to a highest-ranked intent type and/or skill type based on a highest nearest neighbor score value. In other examples, a conversational entity may perform one or more actions based on any intent type and/or skill type for which a nearest neighbor score value exceeds a threshold value.

Contextual information associated with a natural language input may be taken into account by the conversational computing service in identifying an intent type and/or skill type. Contextual information may comprise encoding values for one or more previously encoded linguistic entities (e.g., words, word strings, sentences) received from a user that provided the natural language input. This contextual information may comprise cached data from one or more previous conversations with the conversational bot. The cached data may be from chats with the current user or other users. Users may affirmatively opt in (e.g., via privacy settings) to allow the conversational computing service to utilize their data to improve the service and/or for use in improving intent type and/or skill type identification. The contextual information may additionally or alternatively comprise data from the current conversation with the conversational entity. The contextual information may be utilized as a source of parameter values for a natural language input if they are missing. For example, if a current natural language input comprises: "how much does it cost?" and a previous input comprises "show me the highest rated car in this class", the embedding for "highest rated car" may be utilized as a parameter for "it" in processing the current natural language input.

The conversational computing service may utilize contextual information from a current chat session to augment an embedding library and/or to weight one or more parameters in application of a similarity score model. For example, when talking to a conversational bot for a car assistant, a query may be provided "how far is the closest gas station?". After the response from the conversational bot, a follow-up query could be provided of "and the next one?". The follow-up could be ambiguous (for example another skill of the conversational bot may be concurrently handling a music playlist) so the session context could be helpful in disambiguating the request.

The conversational computing service may also utilize contextual information from a user account and/or from past user interactions. For example, a café may utilize a conversational bot to handle orders. A customer might ask "the usual please". The order may then be fulfilled (e.g., after requesting confirmation by the user) solely based on the contextual information after the customer is identified (e.g., via facial recognition, via voice recognition).

The conversational computing service may utilize domain context in responding to queries and commands Some common knowledge about the domain (e.g., a medical domain or a specific scholastic domain) may be extracted into the conversation context as if it were part of the conversation (in the form of a knowledge base). In addition, conversational entity interactions may be used to fine-tune a language model for the specific domain (e.g., for a medical conversational bot, for a conversational bot for a specific scholastic discipline) training new terms or adding/changing meaning of some words and expressions.

The conversational computing service may utilize time and/or location context in responding to queries and commands. For example, a conversational bot that is asked "what was the score of the game today" on Super Bowl Sunday may not need the name of the game and/or teams involved included in the query to answer the question and determine a correct intent type. In another example, a conversational entity may utilize location data to respond to queries and commands that lack locational words or phrases, but to which location data is pertinent. For example, in responding to a query of "what is the weather today", a conversational bot may take contextual location data (e.g., what location(s) is the user's account associated with, what is the approximate geolocation for an IP address of a device where the query originated) into account for the user in responding.

In some examples, if there is no intent type and/or skill type for which a similarity score exceeds a threshold value, a determination may be made that there is an unknown intent. If a natural language input is determined to comprise an unknown intent, a conversational entity may surface an indication that it needs more information to respond to the input. In some examples, if a natural language input is determined to comprise an unknown intent, a conversational entity may attempt to determine the intent by analyzing contextual information associated with the user (e.g., user account) that presented the natural language input, contextual information from one or more previous interactions with the user that presented the natural language input, and/or contextual information from one or more surrounding sentences or strings. In some examples, if a conversational entity cannot respond to a query or command (e.g., there is an unknown intent and follow-up questions do not clarify the intent and/or conversational context does not lead to resolution), the conversational computing service may flag the query or command for human resolution or provide a notification to the user that the query cannot be resolved.

The systems, methods, and devices described herein provide technical advantages for training language models that may be utilized to process natural language inputs by conversational entities. Processing costs (e.g., CPU cycles) associated with defining intent types and skill types in conversational computing language models are reduced via application of the language embedding models and training architecture described herein. Memory costs are also reduced via the mechanisms and architecture described herein. Typically, conversational computing developers must add thousands of example natural language inputs to a training library for which their entity can respond and perform actions in relation to. Multiple iterations are typically needed to refine those models (train, test, then repeat the process again). Model training is typically needed every time the model is updated with new utterances or intents. The model would then typically need to be published before it could be used by the chat entity. In contrast, according to aspects described herein, conversational computing developers only need to add a minimal number of examples for each intent type and/or skill type (e.g., no need to come up with a large number of utterances per intent). Additionally, there is no separate training time and the model is ready for use as soon as examples are added to it. Further, because the language models described herein are compact, as are the embeddings that are generated for language examples, the processing performed by conversational entities is reduced and may be performed entirely on the client side if desired. Thus, cloud computing to handle incoming inputs may be utilized, but is not necessary.

FIG. 1 is a schematic diagram illustrating an example distributed computing environment 100 for training a language model and use of that model in handling natural language inputs to conversational entities (e.g., bots, assistants). Distributed computing environment 100 includes natural language input sub-environment 102, network and processing sub-environment 118, and result sub-environment 154. Distributed computing environment 100 also includes machine learning models sub-environment 124, which may be incorporated all or in part in a conversational computing service operating in the network and processing sub-environment. For example, the conversational computing service may reside on one or more server computing devices, such as server computing device 122. That is, the conversational computing service may operate all or in part in the cloud. Alternatively, the conversational computing service may operate all or in part on a client computing device (e.g., laptop computing device 108, digital assistant audio device 112, and/or mobile computing device 114). Any and all of the computing devices described herein may communicate with one another via a network, such as network 120.

Natural language input sub-environment 102 includes user 104, laptop computing device 108, digital assistant audio device 112, and mobile computing device 114. User 104 issues natural language input 106A. Natural language input 106A may comprise a command or a query. Natural language input 106A may be received by one of laptop computing device 108, digital assistant audio device 112, or mobile computing device 114. In examples, natural language input 106A may be received by a bot chat interface as illustrated by bot chat element 110 on laptop computing device 108, and bot chat element 116 on mobile computing device 114. For example, a website or application accessed on a computing device may surface a bot chat interface and a natural language input may be typed or audibly received by the bot chat interface. In other examples, natural language input 106A may be received by a digital assistant service, such as by a digital assistant service associated with digital assistant audio device 112. In examples where natural language input 106A is received by a digital assistant service, it may be sent from the digital assistant service to a conversational computing service. In examples where natural language input 106A is received directly by a bot interface, it may be automatically and/or directly received from a corresponding computing device (e.g., laptop computing device 108, mobile computing device 114) by a conversational computing service. Natural language input 106A may be sent to the conversational computing service via an application programming interface (API).

Network and processing sub-environment 118 includes network 120 and server computing device 122. Network and processing sub-environment 118 may comprise a conversational computing service. That is, a conversational computing service may be hosted by one or more server computing devices, such as server computing device 122. The conversational computing service may comprise a plurality of conversational bots. Each of the conversational bots may be associated with one or more manifests. A manifest may comprise an interface definition language (IDL) that includes instructions for sending, receiving, and processing commands associated with skills that a conversational bot may perform. A skill may comprise one or more activities that may be performed by a conversational bot.

In this example, natural language input 106A is sent from one of laptop computing device 108, digital assistant audio device 112, or mobile computing device 114 to the conversational computing service in network and processing sub-environment 124 as illustrated by natural language input 106B. Natural language input 106B may be processed by one or more machine learning models, which are illustrated by machine learning models sub-environment 124. Machine learning models sub-environment 124 includes base embeddings model 126 and bot expansion models 127.

Base embeddings model 126 may comprise a model that generates embeddings from one or more words or sentences in a natural language input. In some examples, the model may be transformer-based encoder language processing model. In some examples, the transformer-based encoder language processing model may be a BERT model. In other examples, the model may comprise one or more of a Sent2Vec layer, an Embeddings from Language Models (ELMo) layer, and/or a recurrent neural network layer. Base embeddings model 126 may comprise an embedding library, such as base embedding library 125, comprising a plurality of word and/or sentence embeddings (e.g., embeddings generated from a transformer-based encoder language processing model). Base embedding library 125 may be populated with embeddings from one or more dictionaries and/or corpuses. In some examples, base embedding library 125 may be populated with embeddings that have been generated from one or more applications and/or services. For example, base embedding library 125 may be continuously populated with new word and/or sentence embeddings from user inputs/queries received by one or more conversational entities associated with the conversational computing service.

According to some examples, the embedding library may be associated with one or more intent types. An intent type may comprise a type of skill or action that a conversational entity may perform in relation to a user input/query. Intent types may have sub-types associated with them. Intents and sub-intent types may also have skills associated with them. Exemplary intent types include: weather intent type, calendar intent type, email intent type, reservation intent type, news intent type, and recommendation intent type. Exemplary skills include: identify and surface weather forecast, identify and surface next meeting, generate new email construct, reserve table at restaurant, identify and surface top news story, and identify and surface highest rated object.

Bot expansion models 127 include bot A machine learning expansion model 128. Bot A machine learning expansion model 128 is illustrative of one or more bot expansion models that may be included in machine learning models 124. That is, additional conversational bot models, including custom embedding libraries, may be included in machine learning models 124. Bot A machine learning expansion model 128 includes embeddings module 132, intents module 134, skills module 136, and response modules 138. Bot A machine learning expansion model 128 is specific to conversational bot A 130.

Embeddings module 132 may comprise a model that generates embeddings (e.g., BERT embeddings, ELMo embeddings) from one or more words or sentences in a natural language input. Embeddings module 132 is associated with custom embedding library 137, which is specific to conversational bot A 130. Custom embedding library 137 may originally be generated from examples provided by the bot developer for conversational bot A 128. For example, the bot developer may provide the embedding model with a plurality of custom intent types and/or custom sub-intent types that conversational bot A may handle, and associate those intent types and/or sub-intent types with example language inputs (e.g., inputs that users can use to target those intents). The examples may be provided to the conversational computing service and/or the embedding model via a TSV file. When the embedding model receives an example language input it may generate one or more embeddings for it (e.g., a plurality of embeddings may be generated if an input is comprised of a plurality of sentences) and associate those one or more embeddings with the intent type or types that were provided with the example. The association may be made in custom embedding library 137 itself and/or with one or more lookup tables.

The embeddings and associated intents from the developer examples for conversational bot A 130 may be provided to a larger embedding library, such as base embedding library 125. For example, custom embedding library 137 may be merged with base embedding library 125. In this manner, a language model for a bot can be quickly trained to handle a wide variety of user inputs utilizing a small number of examples and intent types. That is, when custom embedding library 137 from conversational bot A 130 is merged with base embedding library 125, a large number of embeddings from the examples that were provided by the bot developer of conversational bot 130, but also from other bot developers and other dictionaries and/or corpuses that are encompassed in base embedding library 125, can process new language inputs to conversational bot 130 to identify relevant intent types to associate with user inputs. For example, when a natural language user input is received for conversational bot A 130, the input may be received by the conversational computing service, the input may be processed with a sentence embedding model, the new embedding generated via the sentence embedding model may be added to base embedding model 125 (which has been merged with conversational bot A 130's custom embedding library 137), a similarity score may be calculated for one or more intent types based on the embeddings, and a response may be generated based on one or more intent types for which a similarity score exceeds a threshold value. In examples where a similarity score between the new embedding and an embedding for one or more skills 136 associated with conversational bot 130 exceeds a threshold value, those one or more skills may be performed as the response to the input. That is, a bot developer for a conversational bot may associate a specific skill with a target natural language input for an intent, and if a similarity score between a user input embedding (the new embedding) and the embedding for the target natural language input exceeds a threshold value, the skill may be called by the conversational bot.

Response modules 138 perform operations associated with responding to a natural language input. For example, when an intent type is identified as being relevant to a natural language input via the embedding process described above (e.g., a similarity score between an embedding for a user input and an intent type is exceeded), response modules 138 may be called and process the input based on the intent type that was identified as being relevant. Response modules 138 may extract relevant information from the natural language input and generate a response to the natural language input based on that extraction and one or more skills that may have been called in relation to the relevant intent type. Additional details related to response modules 138 are provided below in relation to FIG. 4.

In this specific example, natural language input 106B may comprise one or more words, one or more phrases, one or more word strings, and/or one or more sentences. When natural language input 106B is received by the conversational computing service, one or more words included in it may be tagged as sentences that will be processed by a sentence embedding model. In examples where natural language input 106B only includes one word, it may be processed with a word embedding model. The embedding model used to generate an embedding from natural language input 106B may be a contextual model that associates contextual data from surrounding words and/or sentences into the embedding. Examples of contextual embedding models that may be utilized include a BERT model, an ELMo model, and a recurrent neural network model. Once the embedding is generated for natural language input 106B, the new embedding may be added to base embedding library 125. A similarity score model may then be applied to the new embedding and one or more embeddings associated with intent types for conversational bot A 130. If a similarity score for an intent type exceeds a threshold value, a response may be generated based on that intent type and/or one or more associated skills may be performed. In this example, the response and/or action performed based on a relevant intent type and/or skill is illustrated as response/action element 152.

The generated response/action is caused to be surfaced in bot chat interface 160 on user interface 158 of computing device 156. Computing device 156 may correspond to laptop computing device 108, digital assistant audio device 112, mobile computing device 114, or another device. For example, for ease of illustration, computing device 156 may correspond to laptop computing device 108, and natural language input 106A is shown as being received as "S1. S2. S3" in bot chat interface 160. The response to that input is illustrated in bot chat interface 160 as "[Response/Action Confirmation]". Alternatively, one or more of the other devices (e.g., mobile computing device 114, digital assistant audio device 112) may provide a response to the user input.

Figure 2:
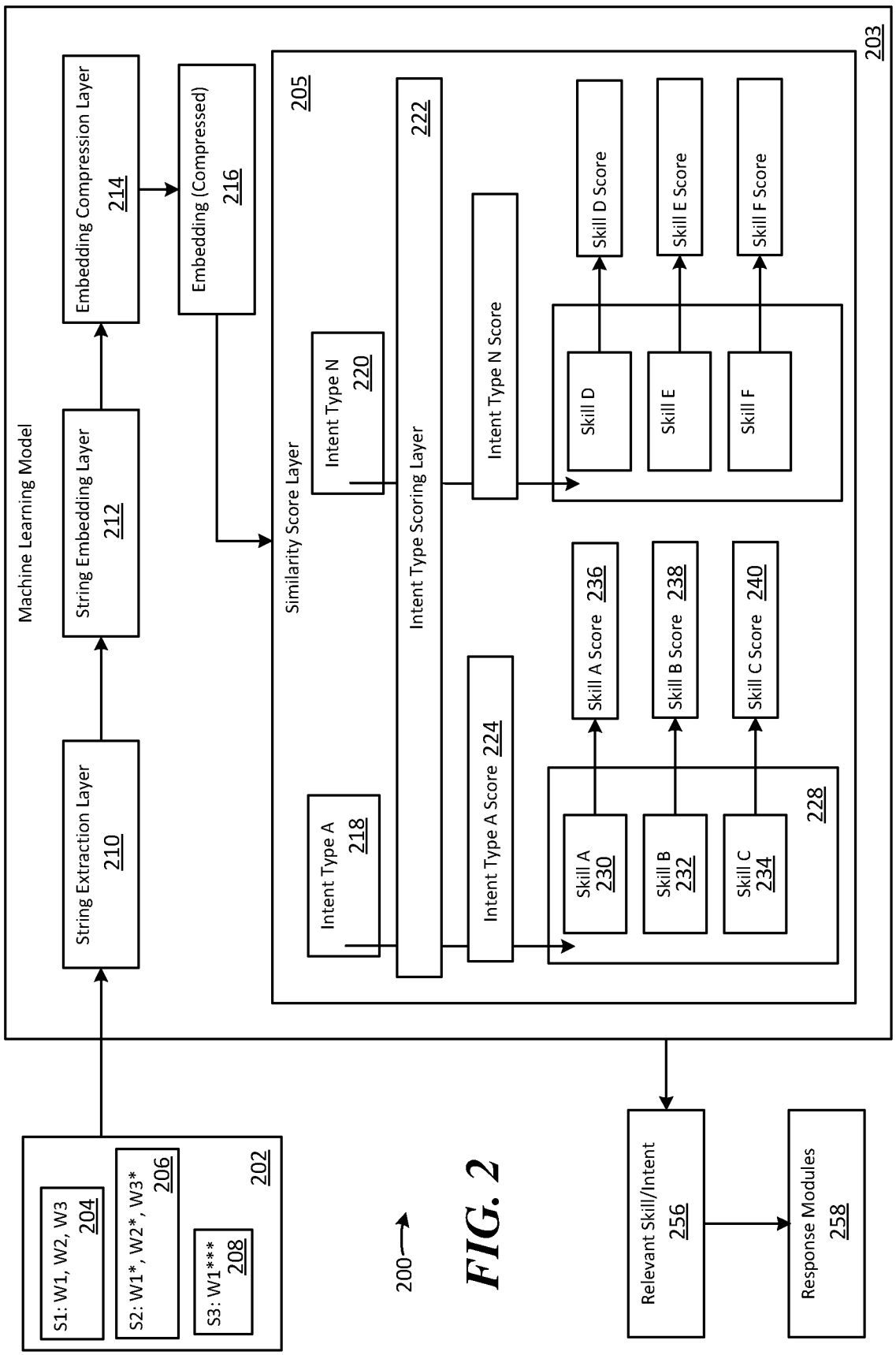
FIG. 2 is a block diagram illustrating an exemplary machine learning language model for handling natural language inputs to conversational entities.

FIG. 2 is a block diagram 200 illustrating an exemplary machine learning language model for handling natural language inputs to conversational entities. Block diagram 200 includes natural language input 202, machine learning model 203, relevant skill/intent element 256, and response modules element 258.

Natural language input 202 is received by a conversational computing service via a conversational bot interface (e.g., a bot chat user interface, an audio input received via an audio interface). In the illustrated example, natural language input 202 includes three strings (string 1 204, string 2 206, string 3 208). String 1 204 is comprised of three words (W1, W2, W3). String 2 206 is comprised of three words (W1*, W2*, W3*). String 3 208 is comprised of one word (W1***).

Natural language input 202 is received by machine learning model 203. Specifically, natural language input 202 is first processed by string extraction layer 210. String extraction layer 210 may apply one or more rules to identify and tag individual strings from a natural language input for further processing. For example, a first rule may dictate that any full sentence (e.g., ending with punctuation) is tagged as a string. A second rule may dictate that any set of words over length X be tagged as an individual string. For example, natural language inputs may comprise run-on sentences that can be better and/or more efficiently further processed if broken up into strings for individual processing. In this example, string extraction layer 210 identifies and tags string 1 204, string 2 206, and string 3 208.

From string extraction layer 210, the strings are passed to string embedding layer 212. String embedding layer 212 comprises a language embedding model. The language embedding model creates an embedding for each string. Thus, a first embedding is generated for string 1 204, a second embedding is generated for string 2 206, and a third embedding is generated for string 3 208. The language embedding model may comprise a contextual embedding model (e.g., a BERT model, an ELMo model, a recurrent neural network model).

The embeddings generated at string embedding layer 212 may then be passed to embedding compression layer 214. Embedding compression layer 214 may comprise a model for transforming a continuous embedding generated for a string by string embedding layer 212 into a binary form. As examples, embedding compression layer 214 may comprise one or more of: a direct binarization with a hard threshold model, reducing the dimensionality with either a random projection or principal component analysis model, and/or an encoding-decoding framework with an additional semantic-preserving loss model.

The compressed (binary) embedding for each string is represented by compressed embedding element 216. The compressed embedding is then incorporated in an embedding library comprised of a plurality of language embeddings. A plurality of those embeddings may be associated with intent types. Similarity scores may be calculated via application of a similarity score model to the new embeddings from the newly embedded strings, and one or more of the embeddings for the intent types. In some examples, the similarity score model may be a cosine model. In other examples, the similarity score model may be a Hamming model. In this example, this is illustrated by similarity score layer 205.

A similarity score is calculated between each embedded string and an embedding for intent type A 218. For example, a bot developer may have associated intent type A 218 with one or more exemplary language inputs, which were subsequently embedded and inserted into an embedding library. A similarity score is then calculated between each embedding from natural language input 202 and the embeddings from the exemplary language inputs for intent type A 218. The scoring and calculation are illustrated by intent type scoring layer 222. Thus, a similarity score, such as intent type A score 224, is calculated for each of the strings, and specifically their compressed embeddings, encompassed in natural language input 202.

In this example, intent type A 218 is associated with a plurality of skills (skill A 230, skill B 232, skill C 234). A bot developer for the corresponding conversational bot may have provided exemplary natural language inputs for targeting each of those skills. Those exemplary natural language inputs may have been embedded and added to the embedding library. Thus, a similarity score may also be calculated for each string embedding from natural language input 202 and each of those skills. The scores are illustrated as skill A score 236, skill B score 238, and skill C score 240. If a similarity score for an embedding for any of the embedded strings exceeds a threshold value for any of skill A 230, skill B 232, and/or skill C 234, the corresponding skill may be executed and/or a response corresponding to the skill may be generated. This is illustrated by relevant skill/intent element 256. The response to natural language input 202 may be specifically tailored to that input based on extraction of relevant information from natural language input 202 via response modules 258 as more fully discussed in relation to FIG. 4.

Intent type N 220 is provided to illustrate that there may be a plurality of intent types and/or corresponding skills associated with an embedding library. Thus, similarity scores for each string embedding from natural language input 202 may also be calculated for exemplary target embeddings for intent type N 220 and/or one or more target embeddings for skills D, E and F associated with intent type N 220.

FIG. 3A illustrates a simplified graph 300A of sentence embeddings in an embedding library and the training of a language model via inclusion of two new examples to the embedding library. Graph 300A includes a first set of embeddings 308A that are related to a meeting intent type. Graph 300A also includes a second set of embeddings 310A that are related to a weather intent type. One or more of the first set of embeddings 308A and the second set of embeddings 310A may have been added as examples by bot developers as being related to their corresponding types (e.g., meeting intent type, weather intent type). In other examples, one or more embeddings from the first set of embeddings 308A and/or the second set of embeddings 310A may have been received from a dictionary and/or corpus and integrated with one or more other embeddings for which intent types were already associated.

FIG. 3A also includes new training examples 302A. New training examples 302A may be included in one or more files. In this example, first training example 304A includes exemplary natural language input "Where is my next meeting?". First training example 304A is provided to the embedding library with an associated intent type "meeting intent type" in addition to a skill type "location lookup and response skill". The natural language input "Where is my next meeting?" of first training example 304A may be encoded as an embedding via a transformer-based encoding language processing model and inserted in graph 300A of the embedding library at location 305A.

Second training example 306A includes exemplary natural language input "What time will it rain today?". Second training example 306A is provided to the embedding library with an associated intent type "weather intent type" in addition to a skill type "weather type time and response skill". The natural language input "What time will it rain today?" of second training example 306A may be encoded as an embedding via a transformer-based encoding language processing model and inserted into graph 300A of the embedding library at location 307A.

FIG. 3B illustrates a simplified graph 300B of sentence embeddings in an embedding library and the use of that embedding library in processing a novel natural language input utilizing a similarity score model. Graph 300B includes a first set of embeddings 308B that are related to a meeting intent type. Graph 300B also includes a second set of embeddings 310B that are related to a weather intent type. One or more of the first set of embeddings 308B and the second set of embeddings 310B may have been added as examples by bot developers as being related to their corresponding types (e.g., meeting intent type, weather intent type). In other examples, one or more embeddings from the first set of embeddings 308B and/or the second set of embeddings 310B may have been received from a dictionary and/or corpus and integrated with one or more other embeddings for which intent types were already associated.

FIG. 3B also includes natural language input sub-environment 302B and response sub-environment 312B. User 304B issues voice query 305B to digital assistant device 306B which directs voice query 305B to a conversational computing service. The conversational computing service may reside on digital assistant device 306B or in the cloud. Voice query 305B states "What time is my next meeting?" The conversational computing service may encode voice query 305B into a sentence embedding. In some examples, the conversational computing service may compress the embedding for voice query 305B into a binary format. The embedding for voice query 305B may be inserted into graph 300B. Upon its embedding, a similarity score model (e.g., a cosine model, a Hamming model) may be applied to the embedding for voice query 305B and one or more embeddings associated with one or more intent types. In this example, the similarity score model is applied to the embedding for voice query 305B and one or more embeddings of the meeting intent type from the first set of embeddings 308B. Additionally, the similarity score model is applied to the embedding for voice query 305B and one or more embeddings of the weather intent type from the second set of embeddings 310B. A KNN model may then be utilized to tally the intent labels from the K closest embeddings (the ones with the highest similarity score with the embedding for voice query 305B) and output an intent label prediction for voice query 305B. Based on application of the similarity score model and the KNN model, a prediction of the meeting intent type is made for voice query 305B. The prediction may be based on a nearest neighbor score value exceeding a threshold value. Additionally, based on application of the similarity score model and the KNN model, it is determined that voice query 305B does not correspond to the weather intent type. As such, only an action and response associated with the meeting intent type is generated.

A response and action corresponding to voice query 305B is directed to appropriate response modules for processing meeting intent types based on the determination that there is a nearest neighbor score value above a threshold value between the embedding for voice query 305B and one or more embeddings of the meeting intent type. Those modules may extract content from the natural language input corresponding to voice query 305B that is relevant to the meeting intent type and process that query accordingly. The processing may additionally comprise analyzing an electronic calendar and/or one or more electronic documents (e.g., productivity documents, emails, presentations) associated with a user account for user 304B. As such, as illustrated in response sub-environment B 312, audio response 313B, which states "You have a one-hour meeting at 3 pm today" is generated by digital assistant device 316B, which is the same device as digital assistant 306B.

Figure 4:
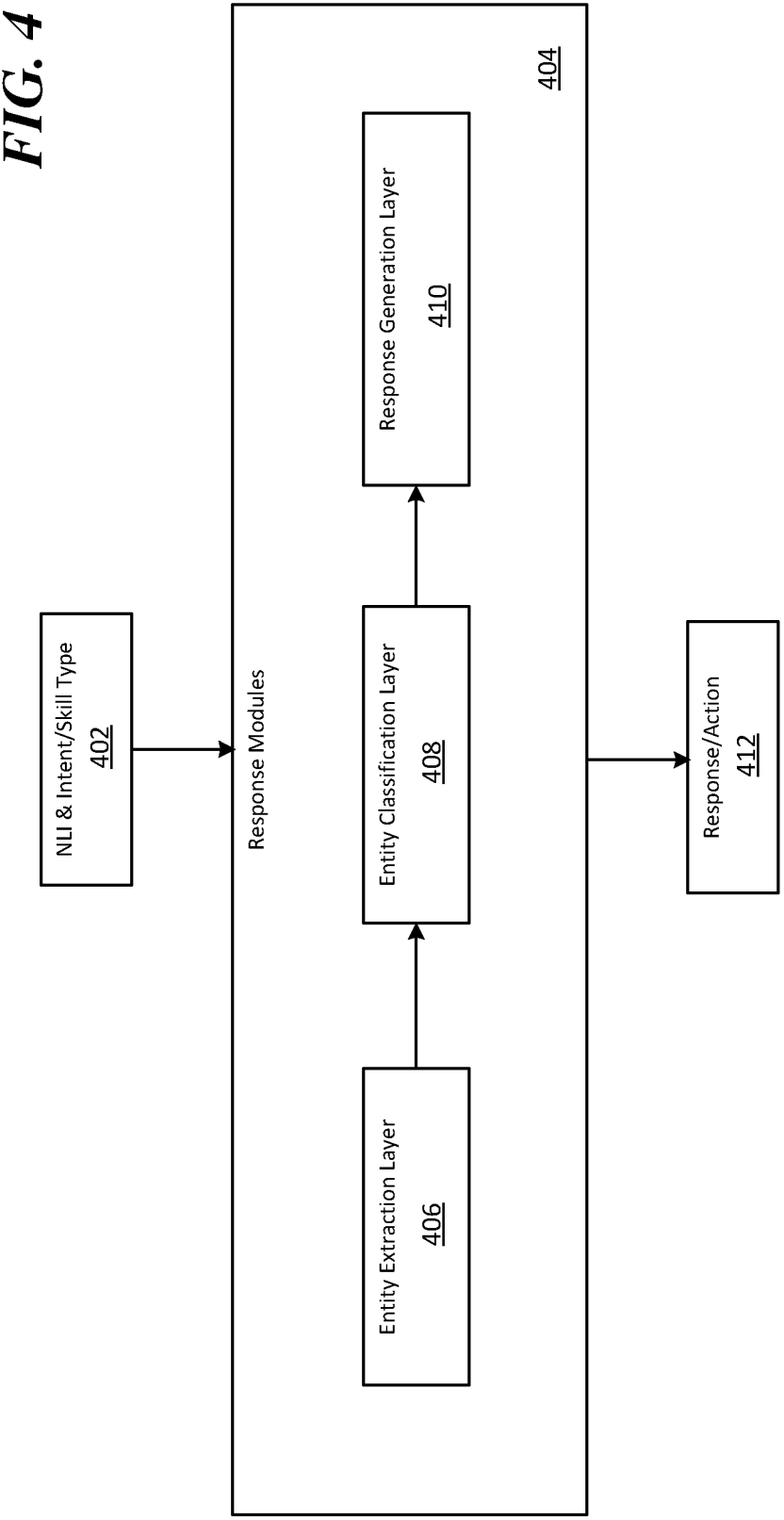
FIG. 4 is a block diagram illustrating response modules of a conversational computing service.

FIG. 4 is a block diagram illustrating response modules of a conversational computing service. A natural language input that has been received and processed by a conversational computing service is processed by response modules 404. The natural language input may be a query or command That query or command may have been encoded as an embedding and inserted into an embedding library. A determination may have then been made via application of a similarity score model that the natural language input is relevant to one or more intent types and/or skills associated with those intent types. In this example, the natural language input is sent to response modules 404 with an indication of the intent type and/or skill type that was identified as being relevant. This is indicated by natural language input intent/skill type element 402.

Response modules 404 include entity extraction layer 406, entity classification layer 408, and response generation layer 410. Entity extraction layer 406 may identify and/or extract entities from the natural language input that are relevant to an intent type that was identified as being relevant to the natural language input. For example, if a similarity score over a threshold value was calculated between an embedding for the natural language input and an embedding having a meeting intent type, entity extraction layer 408 may extract entities from the natural language input that are relevant to the meeting intent type (e.g., location, time, invitees, organizer). Entity classification layer 408 may classify the extracted entities by entity type (e.g., users/people/invitees, meeting locations, meeting times, meeting dates, meeting types, meeting duration). Response generation layer 410 may perform, send, and/or execute the one or more responses, actions, and/or operations that were identified as being relevant based on the embedding for the natural language input being determined to have a similarity score that exceeds a threshold value with an embedding for natural language input associated with a target skill. Thus, in this example, response generation layer 410 generates response/action 412, which may comprise one or more electronic messages and/or one or more application actions that are relevant to the natural language input and its associated intent type.

Figure 5:
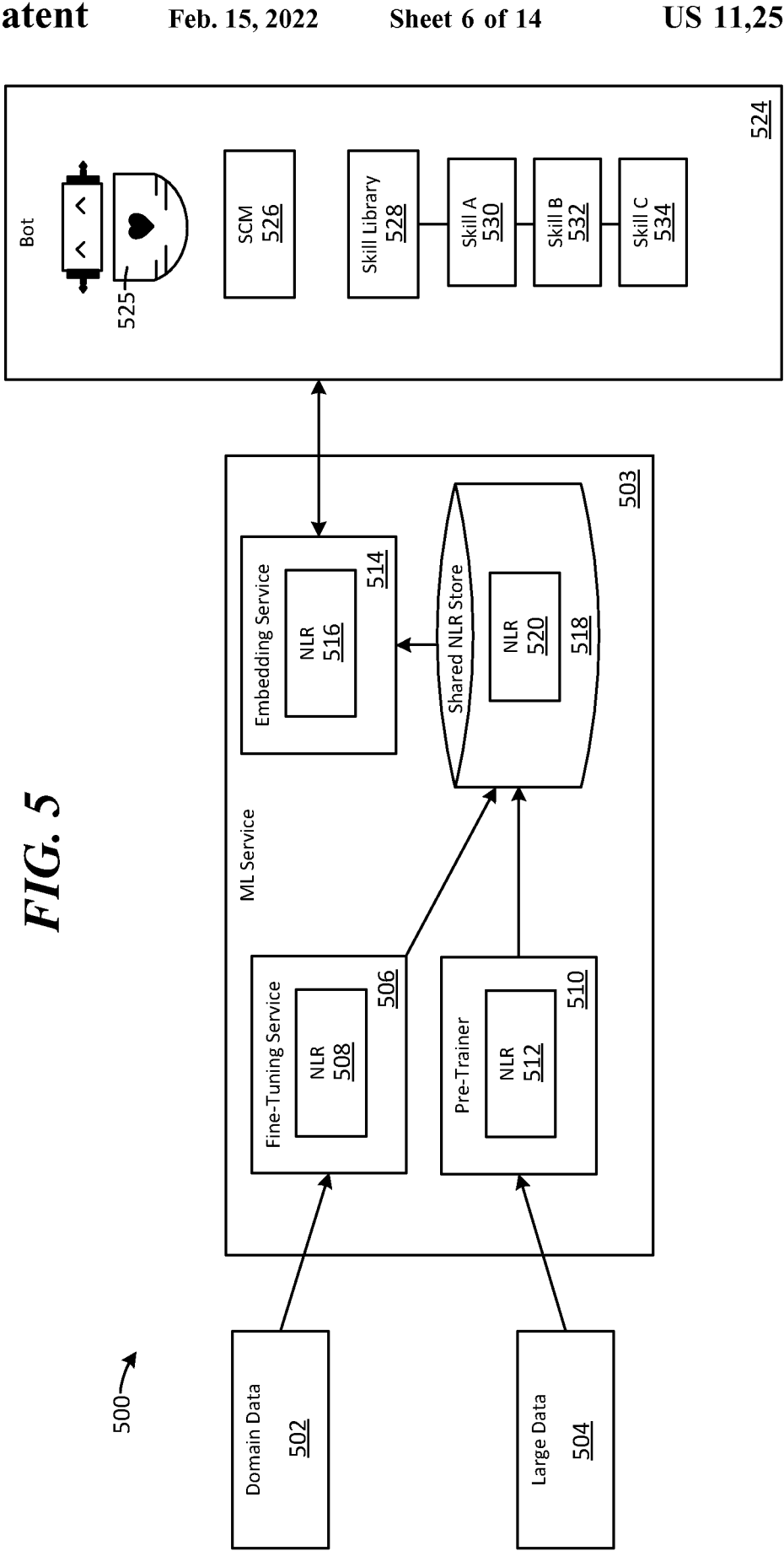
FIG. 5 is a schematic diagram illustrating an example distributed computing environment for training conversational entity language models.

FIG. 5 is a schematic diagram illustrating an example distributed computing environment 500 for training conversational language models. Computing environment 500 includes domain data 502, large data 504, conversational bot architecture 524, and machine learning sub-environment 503.

Domain data 502 comprises a first data source from which embeddings may be generated. Domain data 502 may comprise data associated with one or more website domains. For example, domain data 502 may comprise natural language extracted from one or more website domains related to one or more intent types. As an example, travel website domains may be scraped for language, that language may be encoded as embeddings, and those embeddings may be added to an embedding library. In another example, sport website domains may be scraped for language, that language may be encoded as embeddings, and those embeddings may be added to an embedding library. In some examples, the embeddings generated from domain data 502 may be compressed prior to being added to an embedding library. In additional examples, domain data 502 may comprise language associated with a web search result related to a specific topic (e.g., travel, sports, news, weather). In other examples, domain data 502 may comprise language from domain specific dictionaries and/or corpuses (e.g., medical dictionaries and corpuses, technical dictionaries and corpuses). In some examples, domain data 502 may be automatically associated with an intent type corresponding to a scraped domain when it is added to the embedding library.

Large data 504 may comprise data from one or more general dictionaries and/or corpuses. For example, large data 504 may comprise words, phrases, or other natural language extracted from one or more general dictionaries or general corpuses. The language from these sources need not necessarily be directed to a particular intent type. This language may be encoded as embeddings, and those embeddings may be added to an embedding library. In some examples, the embeddings may be compressed prior to being added to an embedding library.

Machine learning service 503 includes fine-tuning service 506, pre-trainer 510, embedding service 514, and shared natural language representation store 518, each of which include a natural language representation (NLR) transformer-based pre-trained model which may be applied to incoming language data to encode embeddings for that language data. In this example, NLR 508 in fine-tuning service 508 receives domain-specific language from domain data 502 and encodes embeddings from that language. NLR 512 in pre-trainer 510 receives unclassified language from large data 504 and encodes embeddings from that language. In some examples, given the large size of the dictionaries and/or corpuses of large data 504, NLR 512 in pre-trainer 510 may perform the embedding offline. Pre-trainer 510 may be comprised of a toolkit and a container used to run a large job (which may take several days with a GPU). This process may be performed periodically (every month, every two months, etc.) per language or language group.

Shared NLR store may combine the embeddings generated from NLR 508 in fine-tuning service 506, and from NLR 512 in pre-trainer 510.

Embedding service 514 includes NLR 516, which may receive natural language inputs (e.g., commands, queries) from a conversational bot, such as conversational bot 525 in conversational bot architecture 524. For example, a conversational bot may receive a natural language input from a user, and that natural language input may be processed by machine learning service 503. Specifically, embedding service 514, and NLR 516, may transform a natural language input from conversational bot 525 into an embedding used in classification of subsequent language inputs. In some examples, embedding service 514 may transform a batch of natural language inputs from a skill manifest for a conversational bot into a skills classification model that may be used for classification of subsequent language inputs.

Conversational bot architecture 524 includes conversational bot 525, skills classification model 526, skill library 528, and a plurality of skills in skill library 528 (skill A 530, skill B 532, and skill C 534). Skill classification model 526 may be utilized in determining which skill should process a given natural language input. A natural language input may be transformed into an embedding utilizing embedding service 514. The resulting embedding may then be added to an embedding library to classify the natural language input. In some examples, the natural language input may be classified based on its context in a conversation with a conversational bot and/or based on its context with other language it is surrounded by (e.g., sentences before the natural language input, sentences after the natural language input) to match it with a skill.

Figure 6:
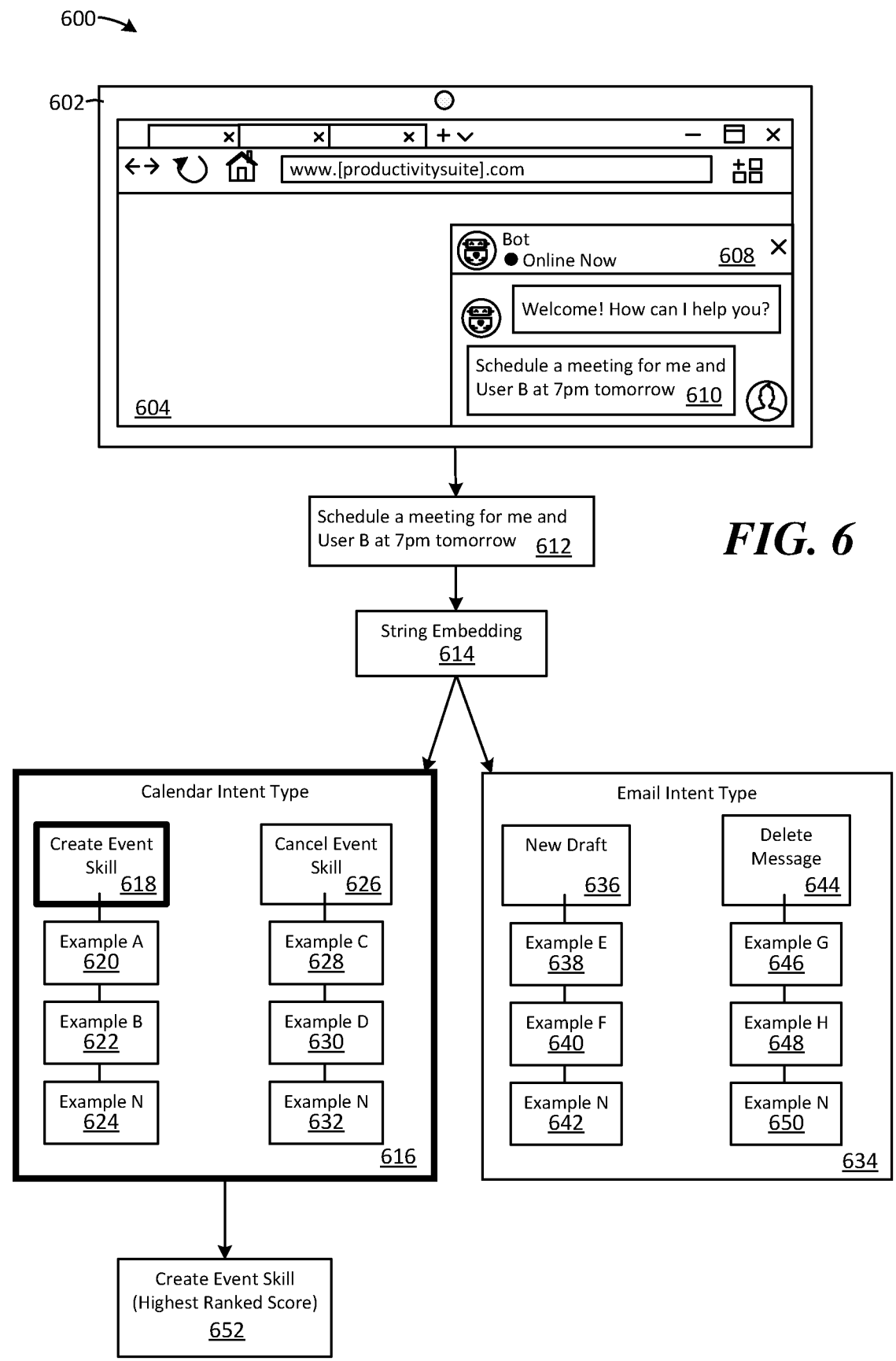
FIG. 6 is a schematic diagram illustrating an example computing environment for processing a natural language input to a conversational entity utilizing a transformer-based encoder language processing model.

FIG. 6 is a schematic diagram illustrating an example computing environment 600 for processing a natural language input to a conversational entity utilizing a transformer-based encoder language processing model. Computing environment 600 includes computing device 602. Computing device 602 has an open web browser 604. Specifically, web browser 604 is currently navigated to www.[productivitysuite].com. That website is illustrative of any website that may have a conversational bot integrated or otherwise associated with it. A chat has been initiated between a user and the conversational bot associated with the website. Specifically, chat window 608 is active with the conversational bot. The conversational bot has entered the text "Welcome! How can I help you?" in chat window 608, and a user has replied with natural language input 610, which states "Schedule a meeting for me and user B at 7 pm tomorrow".

Natural language input 610 may be automatically routed to a conversational computing service where it may be encoded as an embedding by a transformer-based encoder language processing model (e.g., BERT) or another contextual encoder language processing model (e.g., ELMo, recurrent neural network). This is illustrated in FIG. 6 by natural language input element 612 and string embedding element 614. In some examples, the embedding that is generated from natural language input 610 may be compressed into a binary format. The embedding may then be added to an embedding library.

In this example, there are two intent types associated with the conversational bot and the embedding library. Each intent type is further associated with two different skill types. Specifically, there is a calendar intent type 616, which is associated with a create event skill type 616. Create event skill type 616 is associated with a plurality of exemplary embeddings. Those exemplary embeddings are example A 620, example B 622, and example N 624. Similarly, cancel event skill 626 is associated with a plurality of exemplary embeddings. Those exemplary embeddings are example C 628, example D 630, and example N 632.

The second intent type is email intent type 634. Email intent type 634 is associated with new draft skill type 636 and delete message skill type 644. New draft skill type 636 is associated with a plurality of exemplary embeddings. Those exemplary embeddings are example E 638, example F 640, and example N 642. Delete message skill type 644 is also associated with a plurality of example embeddings. Those exemplary embeddings are example G 646, example H 648, and Example N 650.

A similarity score model may be applied to the embedding for natural language input 610 and one or more of the examples for each of the skill types. A similarity score may thus be determined between the embedding for natural language input 610 and each of the skill types. In some examples, only skill types for which the similarity score exceeds a threshold value may be performed by the conversational bot. In other examples, only a highest ranked skill type based on similarity score may be performed by the conversational bot. In this example, a determination is made that the similarity score between the embedding for natural language input 610 and one or more exemplary embeddings for create event skill type 618 is the highest similarity score. As such, that skill may be performed, as illustrated by create event skill (highest ranked score) element 652.

Figure 7:
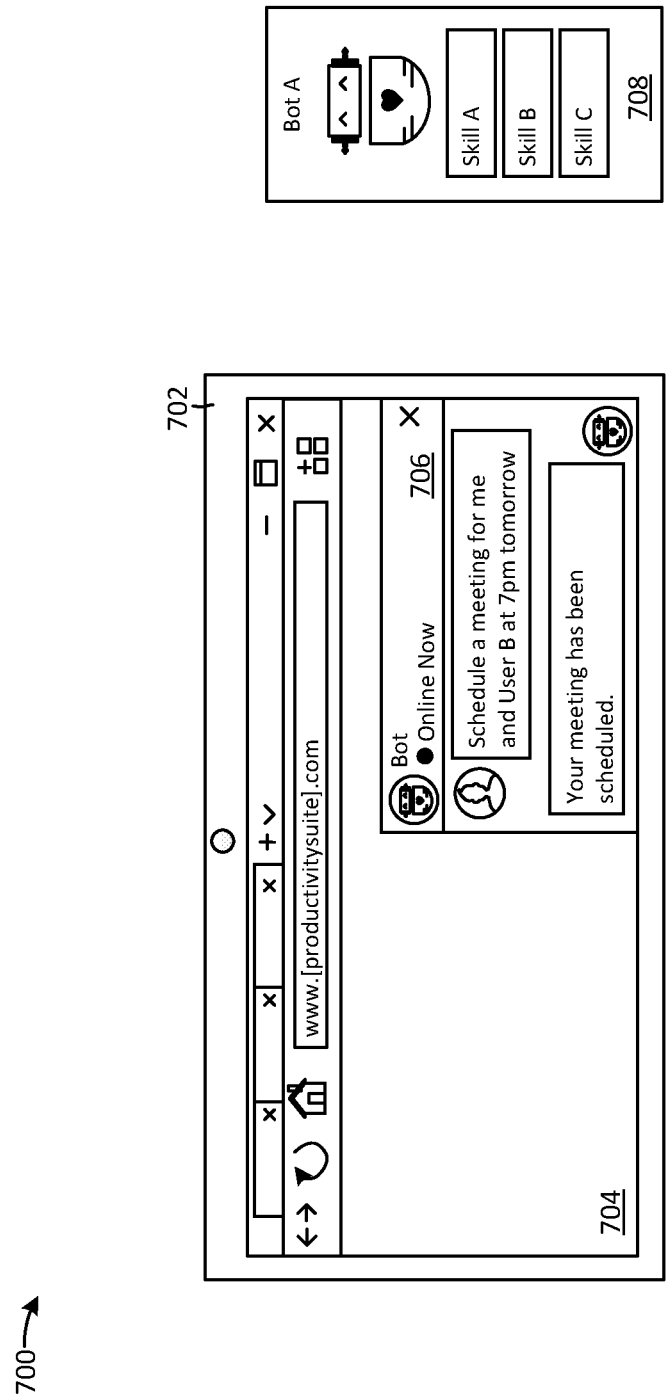
FIG. 7 illustrates the result of the processing of the natural language input that was performed in relation to FIG. 6.

FIG. 7 illustrates the result of the processing of the natural language input that was performed in relation to FIG. 6. FIG. 7 includes computing device 702 and conversational bot A 708. Conversational bot A 708 includes a plurality of skills (skill A, skill B, and skill C). In this example, computing device 702 displays a web browser that is navigated to www.[productivitysuite].com. Bot chat window 706 is open, where a user is chatting with conversational bot A 708. Specifically, the user has entered the natural language input "Schedule a meeting for me and User B at 7 pm tomorrow" in bot chat window 706. That natural language input was routed to the conversational computing service and processed as described above in relation to FIG. 6. As such, conversational bot A 708 performed a "create event" skill and scheduled the desired meeting. Thus, conversational bot A 708 has entered the reply "Your meeting has been scheduled" in bot chat window 706.

Figure 8A:
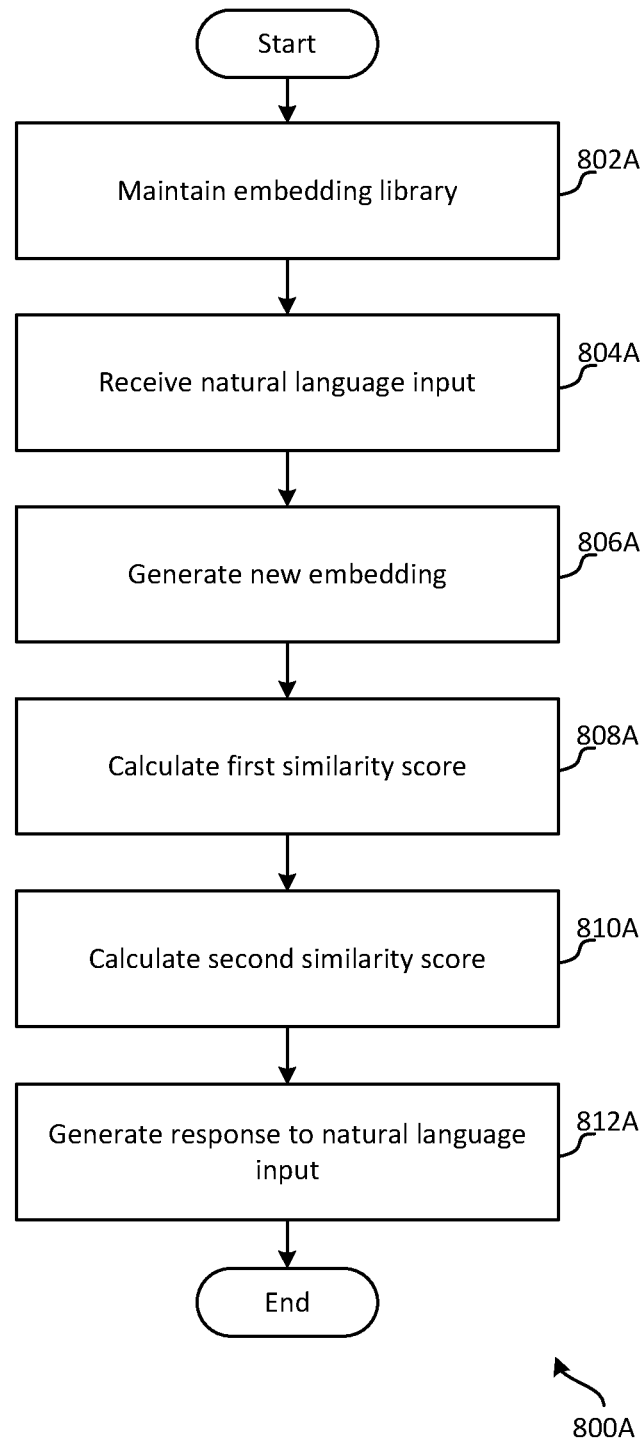
FIG. 8A is an exemplary method for processing natural language in relation to conversational entities.

FIG. 8A is an exemplary method 800A for processing natural language in relation to conversational entities. The method 800A begins at a start operation and flow moves to operation 802A.

At operation 802A an embedding library is maintained. The embedding library may comprise: a first intent type associated with a conversational entity (e.g., a conversational bot, a conversational assistant); a first embedding from a first exemplary input for targeting the first intent type; a second intent type associated with the conversational entity; and a second embedding from a second exemplary input for targeting the second intent type. The intent types may correspond to skills that the conversational entity may perform. In some examples, an intent type may be associated with a plurality of skills that the conversational entity may perform. The exemplary inputs may be provided to a conversational computing service with their associated intent types by a conversational entity developer. For example, a bot developer may provide a TSV file to the conversational computing service that includes an intent type and/or one or more skills in addition to an exemplary language input for targeting that intent type and/or one or more skills. In examples, the embeddings in the embedding library may be maintained in a compressed binary form.

From operation 802A flow continues to operation 804A where a natural language input is received. The natural language input may be a user input to a computing device. The natural language input may be a voice input (e.g., a verbal input) or a text input (e.g., a typed input). The natural language input may comprise one or more words or sentences. The natural language input may be received by a conversational entity. In some examples, the natural language input may be received via an entity interface associated with an application and/or a web browser that the conversational entity is integrated with. In examples, the conversational entity may reside entirely on the computing device on which the natural language input is received. In other examples, the conversational entity may be hosted by a cloud-based conversational computing service and the cloud-based conversational computing service may receive the natural language input.

From operation 804A flow continues to operation 806A where a new embedding for the natural language input is generated. The new embedding may be generated via application of a contextual embedding model to the natural language input. In some examples, the contextual embedding model may comprise an ELMo model. In other examples, the new embedding may be generated via application of a transformer-based encoder language processing model to the natural language input. In some examples, the transformer-based encoder language processing model may comprise a BERT model. In additional examples, the embedding may be compressed and transformed into a binary format.

From operation 806A flow continues to operation 808A where a first similarity score between the new embedding and the first embedding is calculated. The first similarity score may be calculated via application of a similarity score model to the new embedding and the first embedding. According to some examples, the first similarity score may be calculated based on a Hamming distance between the first embedding and the new embedding (in binarized form). In other examples, the first similarity score may be calculated based on a cosine model. For example, a cosine angle between one or more vectors of the first embedding and one or more vectors of the new embedding may be calculated.

From operation 808A flow continues to operation 810A where a second similarity score between the new embedding and the second embedding is calculated. The second similarity score may be calculated via application of a similarity score model to the new embedding and the second embedding. According to some examples, the second similarity score may be calculated based on a Hamming distance between the second embedding and the new embedding (in binarized form). In other examples, the second similarity score may be calculated based on a cosine model. For example, a cosine angle between one or more vectors of the second embedding and one or more vectors of the new embedding may be calculated.

From operation 810A flow continues to operation 812A where a response to the natural language input is generated, the response corresponding to an intent type associated with an embedding having a highest similarity score. In examples, the response may only be generated upon determining that the highest similarity score exceeds a threshold value. In some examples, the intent type and corresponding response may relate to a skill that can be performed by the conversational bot.

From operation 812A flow moves to an end operation and the method 800A ends.

Figure 8B:
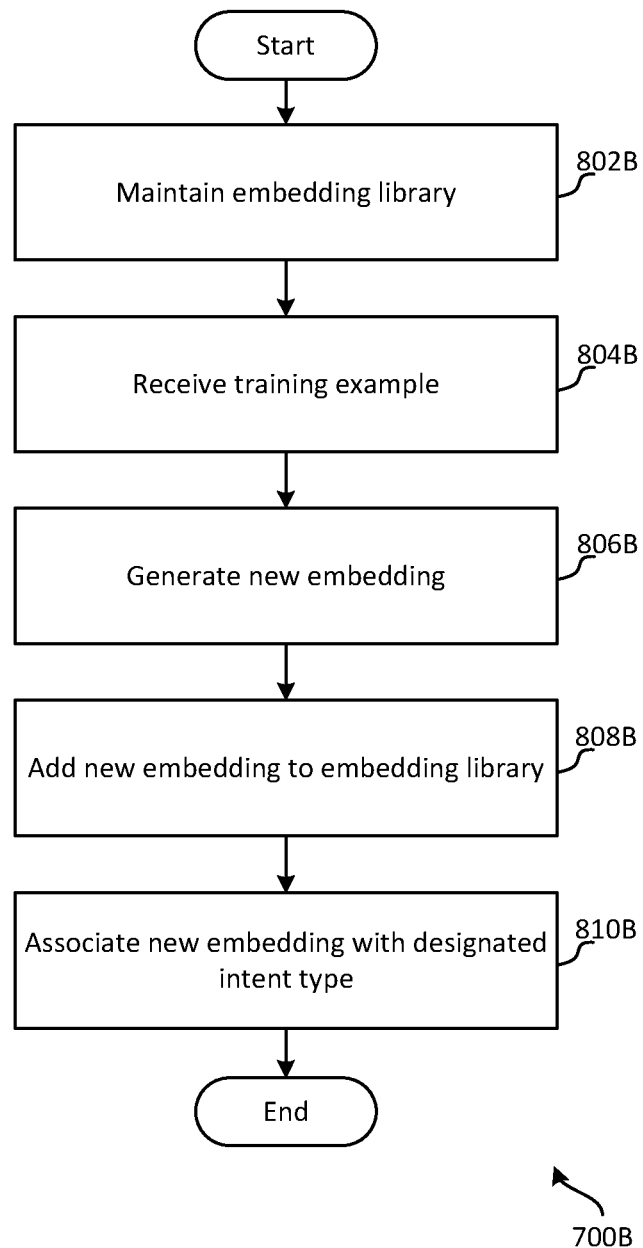
FIG. 8B is an exemplary method for training a conversational language model.

FIG. 8B is an exemplary method 800B for training a conversational language model. The method 800B begins at a start operation and flow moves to operation 802B.

At operation 802B an embedding library is maintained. The embedding library may comprise: a first intent type associated with a conversational entity (e.g., a conversational bot, a conversational assistant); a first embedding from a first exemplary input, the first embedding associated with the first intent type; a second intent type associated with the conversational entity; and a second embedding from a second exemplary input, the second embedding associated with the second intent type. The intent types may correspond to skills that the conversational entity may perform. In some examples, an intent type may be associated with a plurality of skills that the conversational entity may perform. The exemplary inputs may be provided to a conversational computing service with their associated intent types by an entity developer. For example, a bot developer may provide a TSV file to the conversational computing service that includes an intent type and/or one or more skills in addition to an exemplary language input for targeting that intent type and/or one or more skills. In examples, the embeddings in the embedding library may be maintained in a compressed binary form.

From operation 802B flow continues to operation 804B where a training example is received. The training example may comprise: an exemplary natural language input; and a designated intent type that the natural language input applies to, wherein the designated intent type is associated with the exemplary natural language input in the training example. The training example may be received via a file from a bot developer.

From operation 804B flow continues to operation 806B where a new embedding is generated for the exemplary natural language input. The new embedding may be generated via application of a contextual embedding model to the exemplary natural language input. In some examples, the contextual embedding model may comprise an ELMo model. In other examples, the new embedding may be generated via application of a transformer-based encoder language processing model to the exemplary natural language input. In some examples, the transformer-based encoder language processing model may comprise a BERT model. In additional examples, the embedding may be compressed and transformed into a binary format.

From operation 806B flow continues to operation 808B where the new embedding is added to the embedding library. The embedding may be added to the embedding library in a binary format or the original continuous format.

From operation 808B flow continues to operation 810B where the new embedding is associated with the designated intent type. The association may be based on a lookup table associated with the embedding library and/or associated with the conversational entity.

From operation 810B flow moves to an end operation and the method 800B ends.

Figure 9:
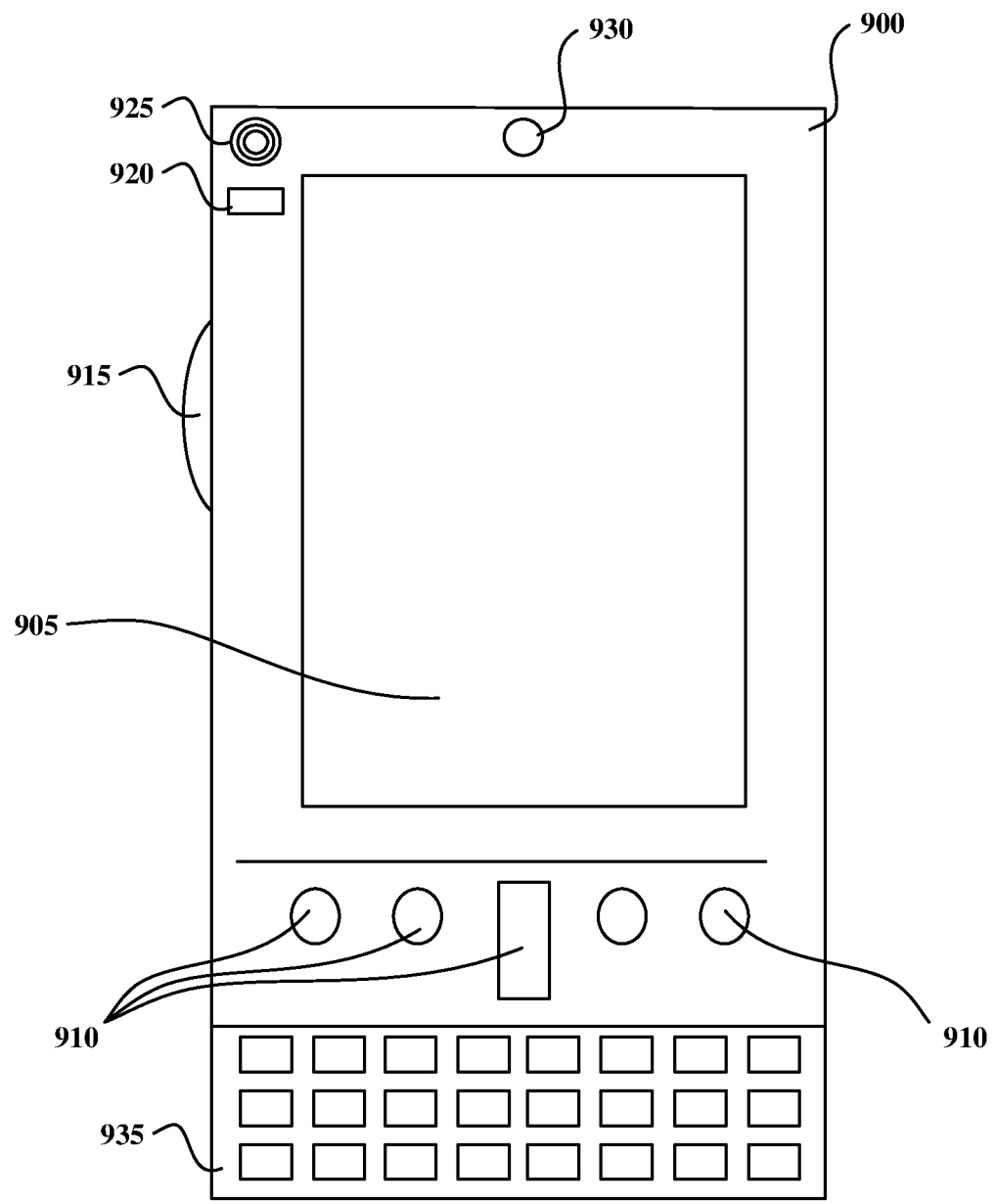
FIGS. 9 and 10 are simplified diagrams of a mobile computing device with which aspects of the disclosure may be practiced.
Figure 10:
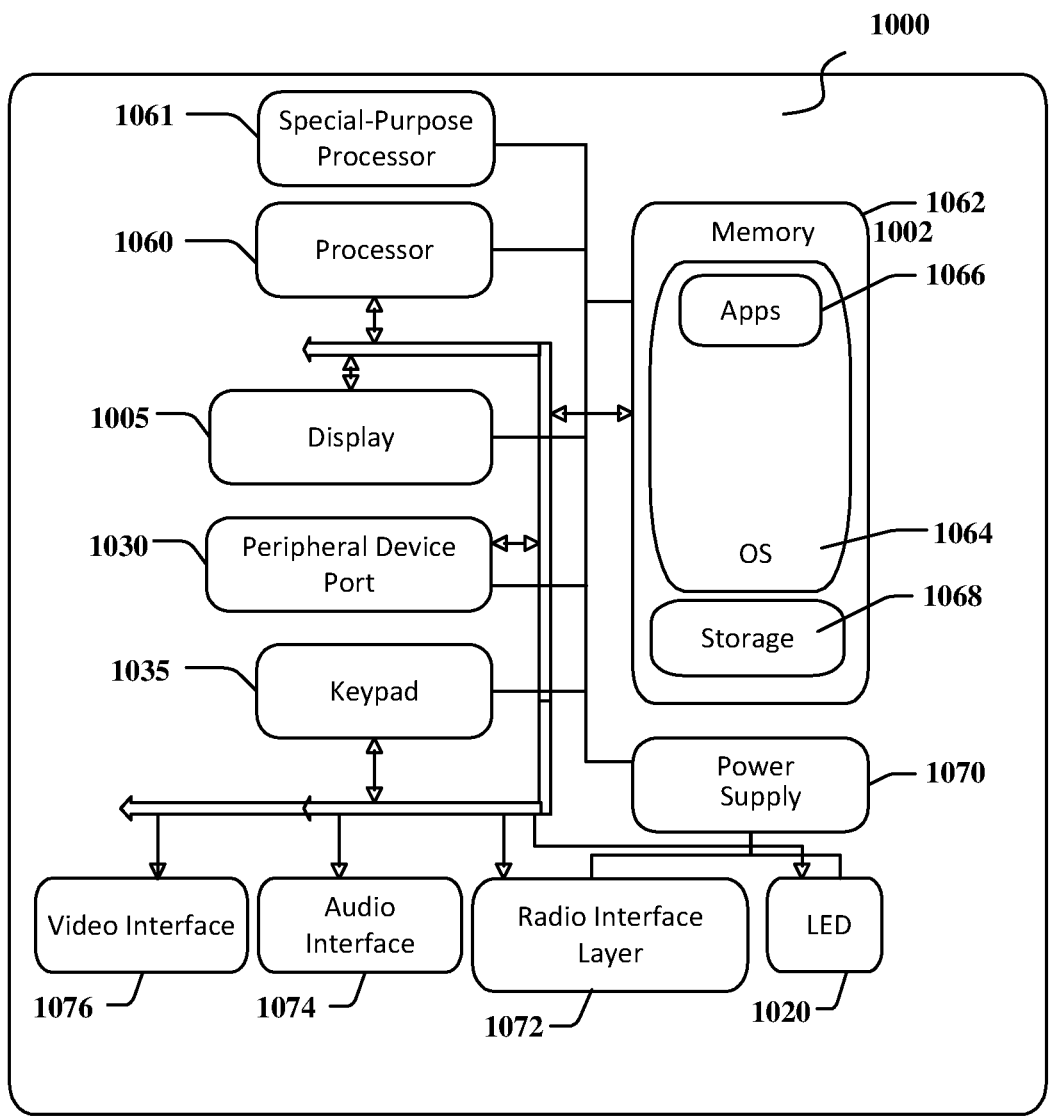

FIGS. 9 and 10 illustrate a mobile computing device 900, for example, a mobile telephone, a smart phone, wearable computer (such as smart eyeglasses), a tablet computer, an e-reader, a laptop computer, or other AR compatible computing device, with which embodiments of the disclosure may be practiced. With reference to FIG. 9, one aspect of a mobile computing device 900 for implementing the aspects is illustrated. In a basic configuration, the mobile computing device 900 is a handheld computer having both input elements and output elements. The mobile computing device 900 typically includes a display 905 and one or more input buttons 910 that allow the user to enter information into the mobile computing device 900. The display 905 of the mobile computing device 900 may also function as an input device (e.g., a touch screen display). If included, an optional side input element 915 allows further user input. The side input element 915 may be a rotary switch, a button, or any other type of manual input element. In alternative aspects, mobile computing device 900 may incorporate more or fewer input elements. For example, the display 905 may not be a touch screen in some embodiments. In yet another alternative embodiment, the mobile computing device 900 is a portable phone system, such as a cellular phone. The mobile computing device 900 may also include an optional keypad 935. Optional keypad 935 may be a physical keypad or a "soft" keypad generated on the touch screen display. In various embodiments, the output elements include the display 905 for showing a graphical user interface (GUI), a visual indicator 920 (e.g., a light emitting diode), and/or an audio transducer 925 (e.g., a speaker). In some aspects, the mobile computing device 900 incorporates a vibration transducer for providing the user with tactile feedback. In yet another aspect, the mobile computing device 900 incorporates input and/or output ports, such as an audio input (e.g., a microphone jack), an audio output (e.g., a headphone jack), and a video output (e.g., a HDMI port) for sending signals to or receiving signals from an external device.

FIG. 10 is a block diagram illustrating the architecture of one aspect of a mobile computing device. That is, the mobile computing device 1000 can incorporate a system (e.g., an architecture) 1002 to implement some aspects. In one embodiment, the system 1002 is implemented as a "smart phone" capable of running one or more applications (e.g., browser, e-mail, calendaring, contact managers, messaging clients, games, and media clients/players). In some aspects, the system 1002 is integrated as a computing device, such as an integrated personal digital assistant (PDA) and wireless phone.

One or more application programs 1066 may be loaded into the memory 1062 and run on or in association with the operating system 1064. Examples of the application programs include phone dialer programs, e-mail programs, personal information management (PIM) programs, word processing programs, spreadsheet programs, Internet browser programs, messaging programs, and so forth. The system 1002 also includes a non-volatile storage area 1068 within the memory 1062. The non-volatile storage area 1068 may be used to store persistent information that should not be lost if the system 1002 is powered down. The application programs 1066 may use and store information in the non-volatile storage area 1068, such as e-mail or other messages used by an e-mail application, and the like. A synchronization application (not shown) also resides on the system 1002 and is programmed to interact with a corresponding synchronization application resident on a host computer to keep the information stored in the non-volatile storage area 1068 synchronized with corresponding information stored at the host computer. As should be appreciated, other applications may be loaded into the memory 1062 and run on the mobile computing device 1000, including instructions for providing and operating a conversational bot platform.

The system 1002 has a power supply 1070, which may be implemented as one or more batteries. The power supply 1070 might further include an external power source, such as an AC adapter or a powered docking cradle that supplements or recharges the batteries.

The system 1002 may also include a radio interface layer 1072 that performs the function of transmitting and receiving radio frequency communications. The radio interface layer 1072 facilitates wireless connectivity between the system 1002 and the "outside world," via a communications carrier or service provider. Transmissions to and from the radio interface layer 1072 are conducted under control of the operating system 1064. In other words, communications received by the radio interface layer 1072 may be disseminated to the application programs 1066 via the operating system 1064, and vice versa.

The visual indicator 920 may be used to provide visual notifications, and/or an audio interface 1074 may be used for producing audible notifications via the audio transducer 925. In the illustrated embodiment, the visual indicator 920 is a light emitting diode (LED) and the audio transducer 925 is a speaker. These devices may be directly coupled to the power supply 1070 so that when activated, they remain on for a duration dictated by the notification mechanism even though the processor 1060 and other components might shut down for conserving battery power. The LED may be programmed to remain on indefinitely until the user takes action to indicate the powered-on status of the device. The audio interface 1074 is used to provide audible signals to and receive audible signals from the user. For example, in addition to being coupled to the audio transducer 925, the audio interface 1074 may also be coupled to a microphone to receive audible input, such as to facilitate a telephone conversation. In accordance with embodiments of the present disclosure, the microphone may also serve as an audio sensor to facilitate control of notifications, as will be described below. The system 1002 may further include a video interface 1076 that enables an operation of an on-board camera 930 to record still images, video stream, and the like.

A mobile computing device 1000 implementing the system 1002 may have additional features or functionality. For example, the mobile computing device 1000 may also include additional data storage devices (removable and/or non-removable) such as, magnetic disks, optical disks, or tape. Such additional storage is illustrated in FIG. 10 by the non-volatile storage area 1068.

Data/information generated or captured by the mobile computing device 1000 and stored via the system 1002 may be stored locally on the mobile computing device 1000, as described above, or the data may be stored on any number of storage media that may be accessed by the device via the radio interface layer 1072 or via a wired connection between the mobile computing device 1000 and a separate computing device associated with the mobile computing device 1000, for example, a server computer in a distributed computing network, such as the Internet. As should be appreciated such data/information may be accessed via the mobile computing device 1000 via the radio interface layer 1072 or via a distributed computing network. Similarly, such data/information may be readily transferred between computing devices for storage and use according to well-known data/information transfer and storage means, including electronic mail and collaborative data/information sharing systems.

Figure 11:
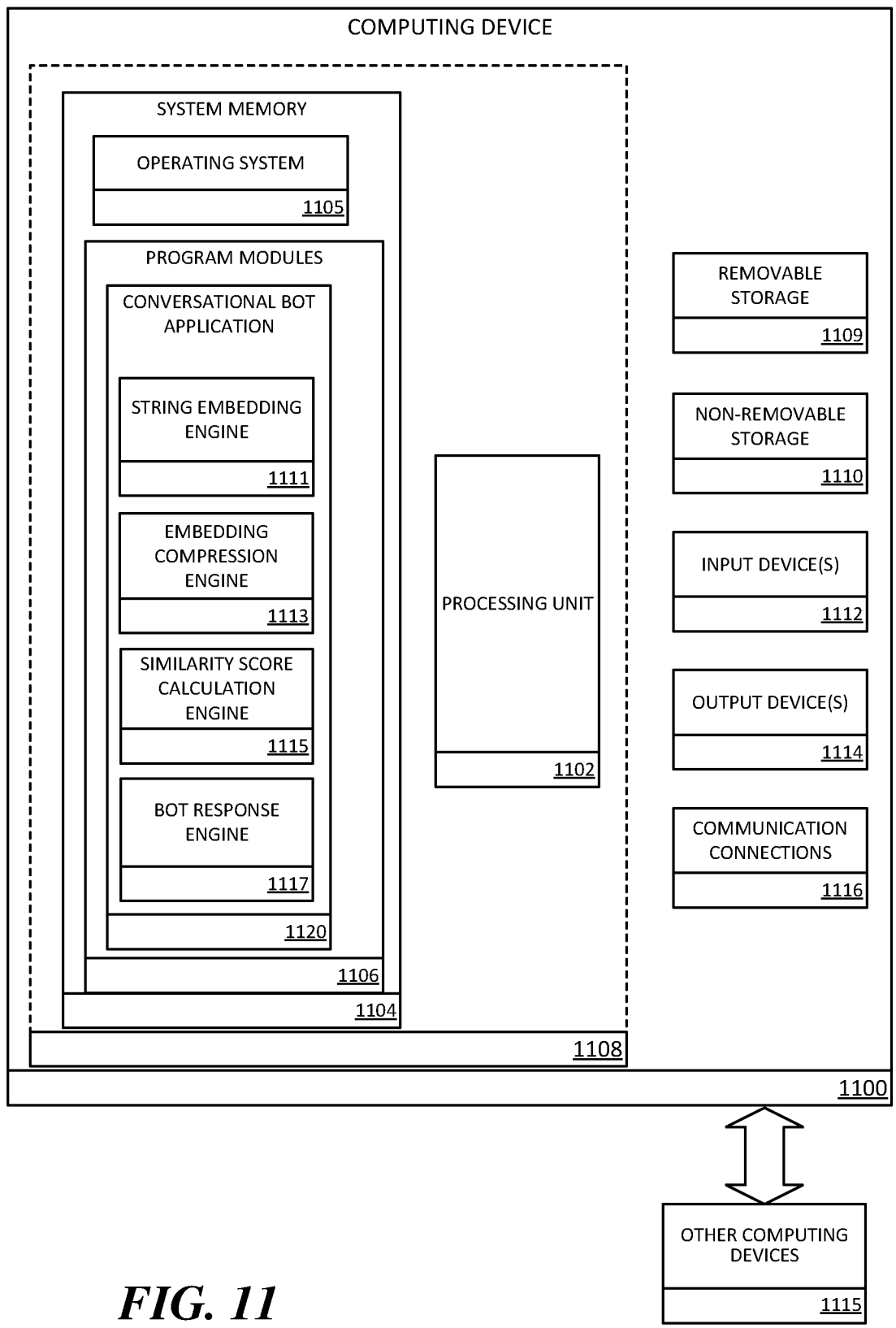
FIG. 11 is a block diagram illustrating example physical components of a computing device with which aspects of the disclosure may be practiced.

FIG. 11 is a block diagram illustrating physical components (e.g., hardware) of a computing device 1100 with which aspects of the disclosure may be practiced. The computing device components described below may have computer executable instructions for assisting conversational entity interactions. In a basic configuration, the computing device 1100 may include at least one processing unit 1102 and a system memory 1104. Depending on the configuration and type of computing device, the system memory 1104 may comprise, but is not limited to, volatile storage (e.g., random access memory), non-volatile storage (e.g., read-only memory), flash memory, or any combination of such memories. The system memory 1104 may include an operating system 1105 suitable for running one or more conversational entity applications and/or services. The operating system 1105, for example, may be suitable for controlling the operation of the computing device 1100. Furthermore, embodiments of the disclosure may be practiced in conjunction with a graphics library, other operating systems, or any other application program and is not limited to any particular application or system. This basic configuration is illustrated in FIG. 11 by those components within a dashed line 1108. The computing device 1100 may have additional features or functionality. For example, the computing device 1100 may also include additional data storage devices (removable and/or non-removable) such as, for example, magnetic disks, optical disks, or tape. Such additional storage is illustrated in FIG. 11 by a removable storage device 1109 and a non-removable storage device 1110.

As stated above, a number of program modules and data files may be stored in the system memory 1104. While executing on the processing unit 1102, the program modules 1106 (e.g., conversational bot application 1120) may perform processes including, but not limited to, the aspects, as described herein. According to examples, string embedding engine 1111 may perform one or more operations associated with receiving a natural language input and encoding one or more embeddings for that natural language input. Embedding compression engine 1113 may perform one or more operations associated with converting a continuous embedding for a natural language input into a binary input. Similarity score calculation engine 1115 may perform one or more operations associated with applying a KNN model to a plurality of embeddings and calculating a similarity score for those embeddings. Bot response engine 1117 may perform one or more operations associated with generating a response to a natural language input based on an intent type and/or skill type corresponding to an embedding with a highest similarity score for a given natural language input and its embedding.

Furthermore, embodiments of the disclosure may be practiced in an electrical circuit comprising discrete electronic elements, packaged or integrated electronic chips containing logic gates, a circuit utilizing a microprocessor, or on a single chip containing electronic elements or microprocessors. For example, embodiments of the disclosure may be practiced via a system-on-a-chip (SOC) where each or many of the components illustrated in FIG. 11 may be integrated onto a single integrated circuit. Such an SOC device may include one or more processing units, graphics units, communications units, system virtualization units and various application functionality all of which are integrated (or "burned") onto the chip substrate as a single integrated circuit. When operating via an SOC, the functionality, described herein, with respect to the capability of client to switch protocols may be operated via application-specific logic integrated with other components of the computing device 1100 on the single integrated circuit (chip). Embodiments of the disclosure may also be practiced using other technologies capable of performing logical operations such as, for example, AND, OR, and NOT, including but not limited to mechanical, optical, fluidic, and quantum technologies. In addition, embodiments of the disclosure may be practiced within a general purpose computer or in any other circuits or systems.

The computing device 1100 may also have one or more input device(s) 1112 such as a keyboard, a mouse, a pen, a sound or voice input device, a touch or swipe input device, etc. The output device(s) 1114 such as a display, speakers, a printer, etc. may also be included. The aforementioned devices are examples and others may be used. The computing device 1100 may include one or more communication connections 1116 allowing communications with other computing devices 1150. Examples of suitable communication connections 1116 include, but are not limited to, radio frequency (RF) transmitter, receiver, and/or transceiver circuitry; universal serial bus (USB), parallel, and/or serial ports.

The term computer readable media as used herein may include computer storage media. Computer storage media may include volatile and nonvolatile, removable and non-removable media implemented in any method or technology for storage of information, such as computer readable instructions, data structures, or program modules. The system memory 1104, the removable storage device 1109, and the non-removable storage device 1110 are all computer storage media examples (e.g., memory storage). Computer storage media may include RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other article of manufacture which can be used to store information and which can be accessed by the computing device 1100. Any such computer storage media may be part of the computing device 1100. Computer storage media does not include a carrier wave or other propagated or modulated data signal.

Communication media may be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media.

Figure 12:
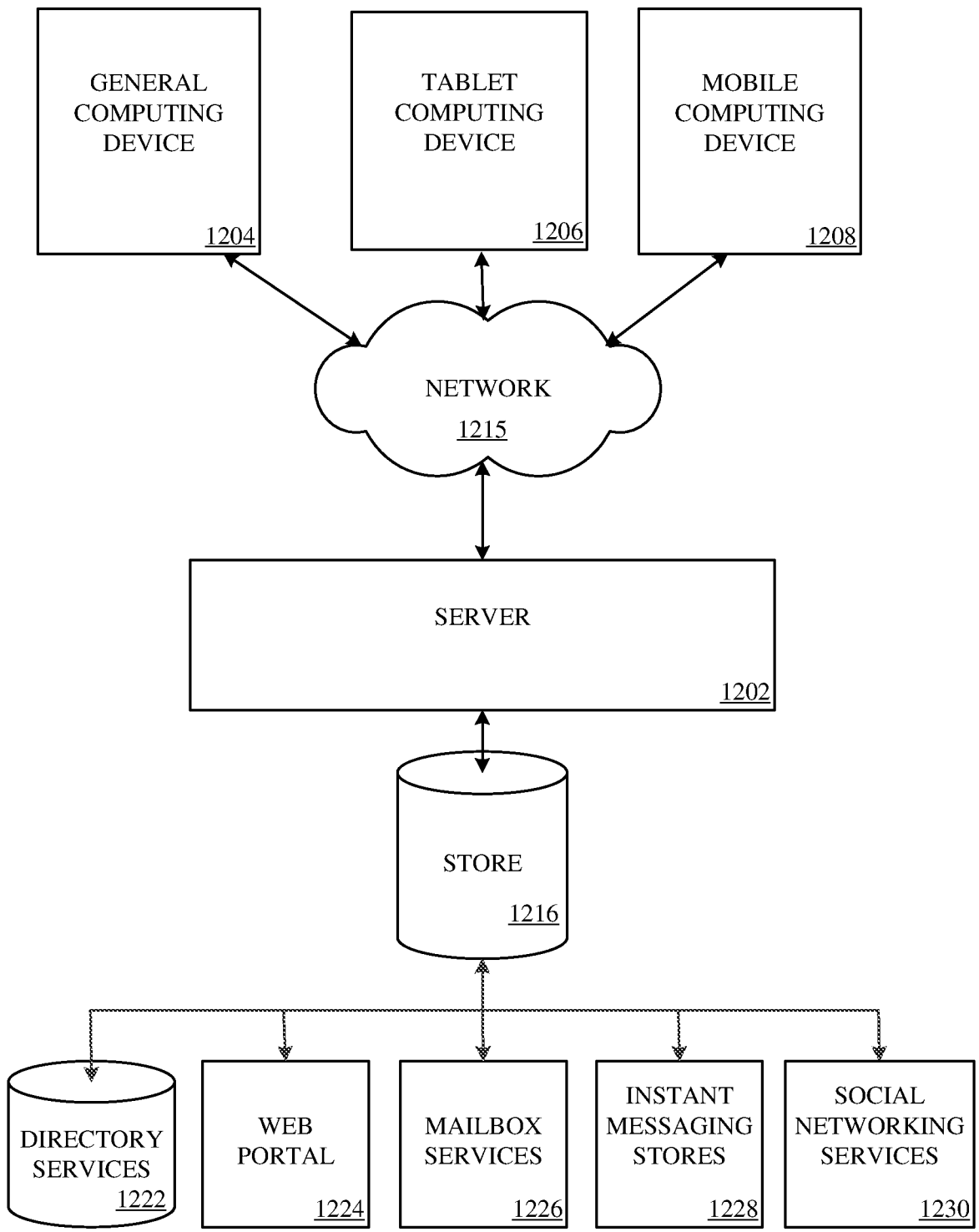
FIG. 12 is a simplified block diagram of a distributed computing system in which aspects of the present disclosure may be practiced.

FIG. 12 illustrates one aspect of the architecture of a system for processing data received at a computing system from a remote source, such as a personal/general computer 1204, tablet computing device 1206, or mobile computing device 1208, as described above. Content displayed at server device 1202 may be stored in different communication channels or other storage types. For example, various documents may be stored using a directory service 1222, a web portal 1224, a mailbox service 1226, an instant messaging store 1228, or a social networking site 1230. The program modules 1106 may be employed by a client that communicates with server device 1202, and/or the program modules 1106 may be employed by server device 1202. The server device 1202 may provide data to and from a client computing device such as a personal/general computer 1204, a tablet computing device 1206 and/or a mobile computing device 1208 (e.g., a smart phone) through a network 1215. By way of example, the computer systems described herein may be embodied in a personal/general computer 1204, a tablet computing device 1206 and/or a mobile computing device 1208 (e.g., a smart phone). Any of these embodiments of the computing devices may obtain content from the store 1216, in addition to receiving graphical data useable to be either pre-processed at a graphic-originating system, or post-processed at a receiving computing system.

Aspects of the present disclosure, for example, are described above with reference to block diagrams and/or operational illustrations of methods, systems, and computer program products according to aspects of the disclosure. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

The description and illustration of one or more aspects provided in this application are not intended to limit or restrict the scope of the disclosure as claimed in any way. The aspects, examples, and details provided in this application are considered sufficient to convey possession and enable others to make and use the best mode of claimed disclosure. The claimed disclosure should not be construed as being limited to any aspect, example, or detail provided in this application. Regardless of whether shown and described in combination or separately, the various features (both structural and methodological) are intended to be selectively included or omitted to produce an embodiment with a particular set of features. Having been provided with the description and illustration of the present disclosure, one skilled in the art may envision variations, modifications, and alternate aspects falling within the spirit of the broader aspects of the general inventive concept embodied in this application that do not depart from the broader scope of the claimed disclosure.

The various embodiments described above are provided by way of illustration only and should not be construed to limit the claims attached hereto. Those skilled in the art will readily recognize various modifications and changes that may be made without following the example embodiments and applications illustrated and described herein, and without departing from the true spirit and scope of the following claims.

What is claimed is:

1. A computer-implemented method for processing natural language, the computer-implemented method comprising:
    maintaining an embedding library, the embedding library comprising:
        a first intent type associated with a conversational entity;
        a first embedding from a first exemplary input for targeting the first intent type;
        a second intent type associated with the conversational entity; and
        a second embedding from a second exemplary input for targeting the second intent type;
    receiving a natural language input;
    generating a new embedding for the natural language input;
    calculating a first similarity score between the new embedding and the first embedding;
    determining that the first similarity score exceeds a threshold similarity score value;
    calculating a second similarity score between the new embedding and the second embedding;
    determining that the second similarity score exceeds the threshold similarity score value; and
    generating a response to the natural language input, the response corresponding to the first intent type and the second intent type.

2. The computer-implemented method of claim 1, wherein the new embedding is generated via application of a transformer-based encoder language processing model to the natural language input.

3. The computer-implemented method of claim 2, wherein the transformer-based encoder language processing model is a bidirectional encoder representations from transformers model.

4. The computer-implemented method of claim 1, wherein the first similarity score between the new embedding and the first embedding is calculated based on application of a cosine model to the new embedding and the first embedding.

5. The computer-implemented method of claim 1, wherein:
    the first embedding is originally generated as a continuous sentence embedding representation;
    the second embedding is originally generated as a continuous sentence embedding representation;
    the new embedding is originally generated as a continuous sentence embedding representation; and
    the first embedding, the second, embedding, and the new embedding are transformed into a compressed binarized form prior to calculation of the first similarity score and the second similarity score.

6. The computer-implemented method of claim 1, wherein the first similarity score is calculated based on a Hamming distance between the binarized embedding for the first embedding and the binarized embedding for the new embedding.

7. The computer-implemented method of claim 1, further comprising:
    receiving a training example, the training example comprising:
        an exemplary natural language input; and
        a designated intent type that the natural language input applies to, wherein the designated intent type is associated with the exemplary natural language input in the training example;
    generating an embedding for the exemplary natural language input; and
    adding the embedding for the exemplary natural language input to the embedding library.

8. The computer-implemented method of claim 7, wherein the training example is received as a Tab Separated Values file.

9. The computer-implemented method of claim 1, wherein the new embedding is a contextualized embedding based on one or more surrounding sentences of the natural language input.

10. A computer-readable storage device comprising executable instructions that, when executed by one or more processors, assists with processing natural language by conversational entities, the computer-readable storage device including instructions executable by the one or more processors for:
    maintaining an embedding library, the embedding library comprising:
        a first intent type associated with a conversational entity;
        a first embedding from a first exemplary input for targeting the first intent type;
        a second intent type associated with the conversational entity;
        a second embedding from a second exemplary input for targeting the second intent type
    receiving a natural language input;
    generating a new embedding for the natural language input;
    calculating a first similarity score between the new embedding and the first embedding;

determining that the first similarity score exceeds a threshold similarity score value;

calculating a second similarity score between the new embedding and the second embedding;

determining that the second similarity score exceeds the threshold similarity score value; and generating a response to the natural language input, the response corresponding to the first intent type and the second intent type.

11. The computer-readable storage device of claim 10, wherein in calculating the first similarity score between the new embedding and the first embedding, the instructions are further executable by the one or more processors for:

applying a K Nearest Neighbors model to the new embedding and the first embedding.

12. A system for processing natural language, comprising:

a memory for storing executable program code; and one or more processors, functionally coupled to the memory, the one or more processors being responsive to computer-executable instructions contained in the program code and operative to:

maintain an embedding library, the embedding library comprising:
- a first intent type associated with a conversational entity;
- a first embedding from a first exemplary input for targeting the first intent type;
- a second intent type associated with the conversational entity; and
- a second embedding from a second exemplary input for targeting the second intent type;

receive a natural language input;

generate a new embedding for the natural language input;

calculate a first similarity score between the new embedding and the first embedding;

determine that the first similarity score exceeds a threshold similarity score value;

calculate a second similarity score between the new embedding and the second embedding;

determine that the second similarity score exceeds the threshold similarity score value; and generate a response to the natural language input, the response corresponding to the first intent type and the second intent type.

13. The system of claim 12, wherein in generating the response to the natural language input, the one or more processors are further responsive to the computer-executable instructions contained in the program code and operative to:

apply a transformer-based encoder language processing model to the natural language input.

14. The system of claim 13, wherein the transformer-based encoder language processing model is a bidirectional encoder representations from transformers model.

15. The system of claim 12, wherein the first similarity score between the new embedding and the first embedding is calculated based on application of a cosine model to the new embedding and the first embedding.

16. The system of claim 12, wherein the one or more processors are further responsive to the computer-executable instructions contained in the program code and operative to:

originally generate the first embedding as a continuous sentence embedding representation;

originally generate the second embedding as a continuous sentence embedding representation;

originally generate the new embedding as a continuous sentence embedding representation; and transform the first embedding, the second embedding, and the new embedding into a compressed binarized form prior to calculation of the first similarity score and the second similarity score.

17. The system of claim 12, wherein the first similarity score is calculated based on a Hamming distance between the binarized embedding for the first embedding and the binarized embedding for the new embedding.

18. The system of claim 12, wherein the one or more processors are further responsive to the computer-executable instructions contained in the program code and operative to:

receive a training example, the training example comprising:
- an exemplary natural language input; and
- a designated intent type that the natural language input applies to, wherein the designated intent type is associated with the exemplary natural language input in the training example;

generate an embedding for the exemplary natural language input; and add the embedding for the exemplary natural language input to the embedding library.

19. The system of claim 18, wherein the training example is received as a Tab Separated Values file.

20. The system of claim 12, wherein the new embedding is a contextualized embedding based on one or more surrounding sentences of the natural language input.

* * * * *